Dec. 15, 1942.  E. E. MINOR ET AL  2,305,267
VIBRATION MEASURING APPARATUS.
Filed Aug. 5, 1939   10 Sheets-Sheet 1

Inventor
EDWARD E. MINOR,
STANLEY A. KILPATRICK
Attorney

Dec. 15, 1942.  E. E. MINOR ET AL  2,305,267
VIBRATION MEASURING APPARATUS
Filed Aug. 5, 1939    10 Sheets-Sheet 2
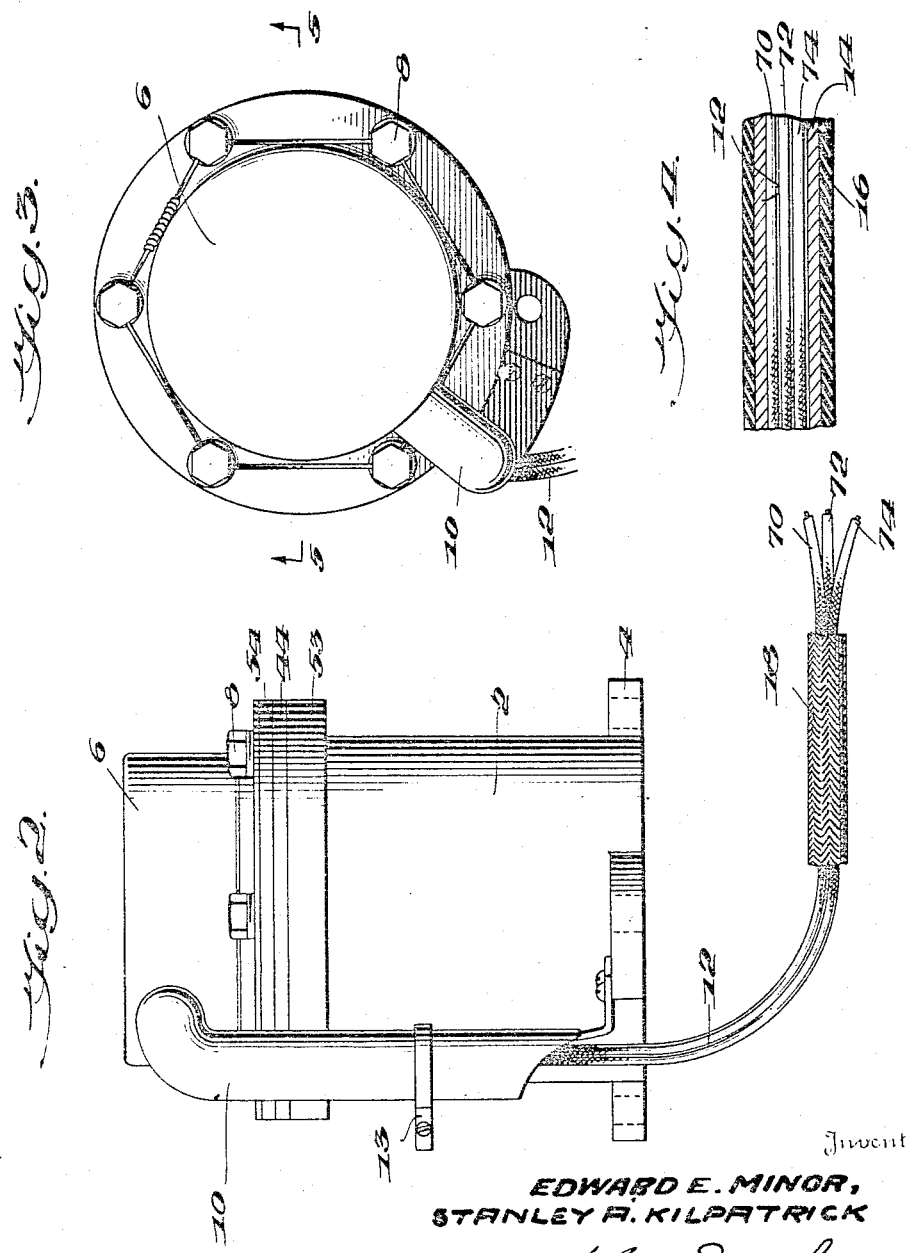
Inventor
EDWARD E. MINOR,
STANLEY A. KILPATRICK
Attorney

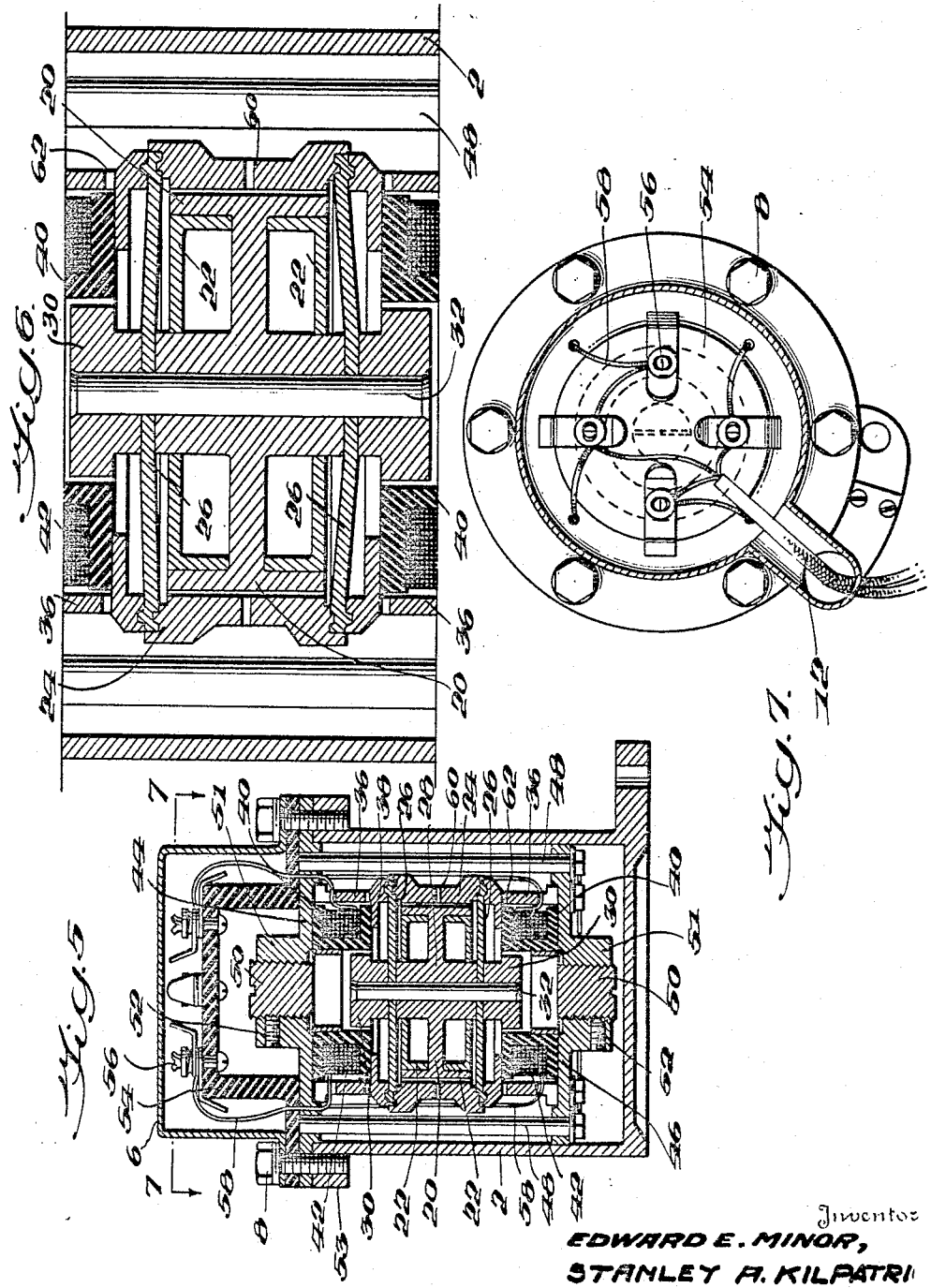

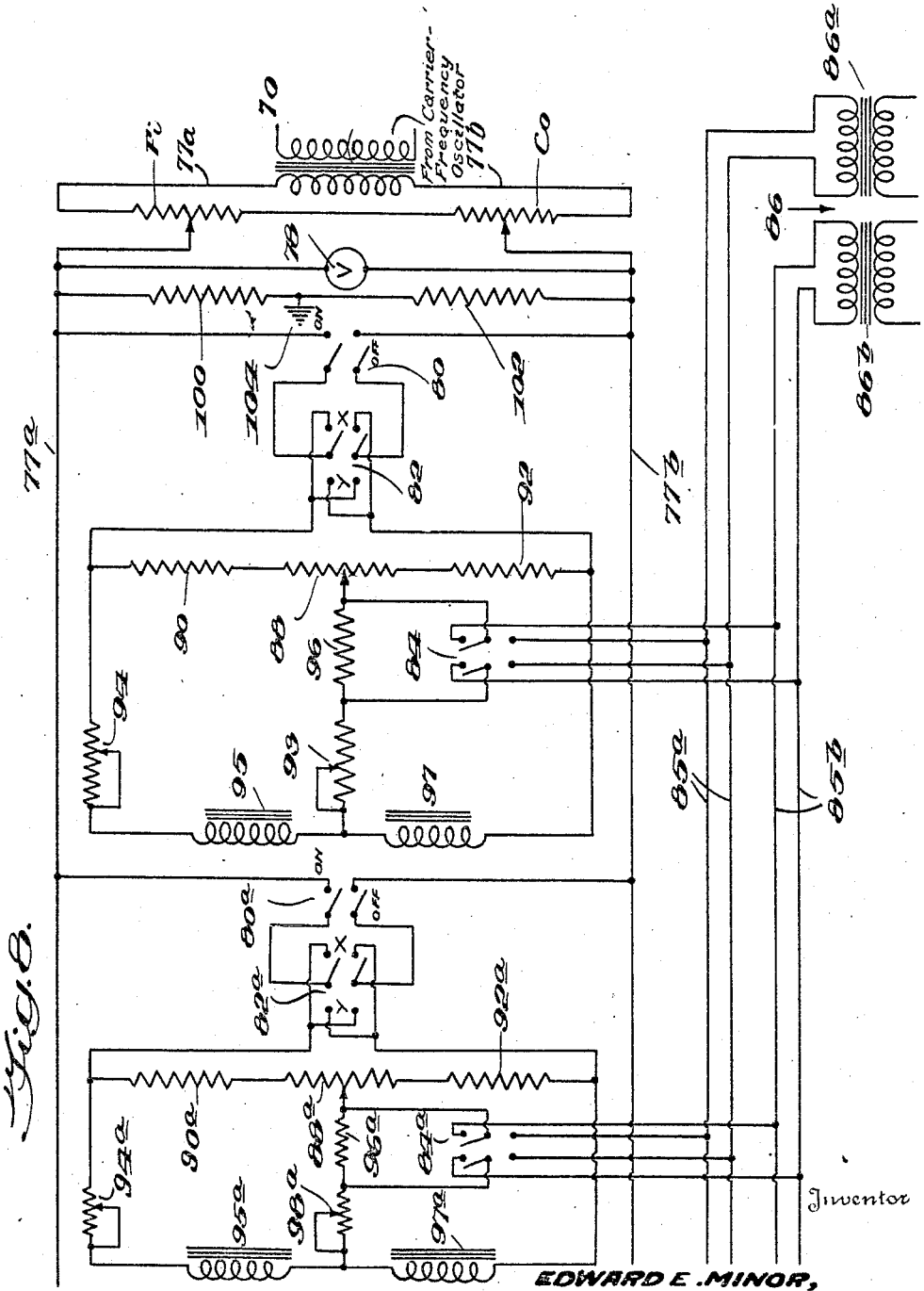

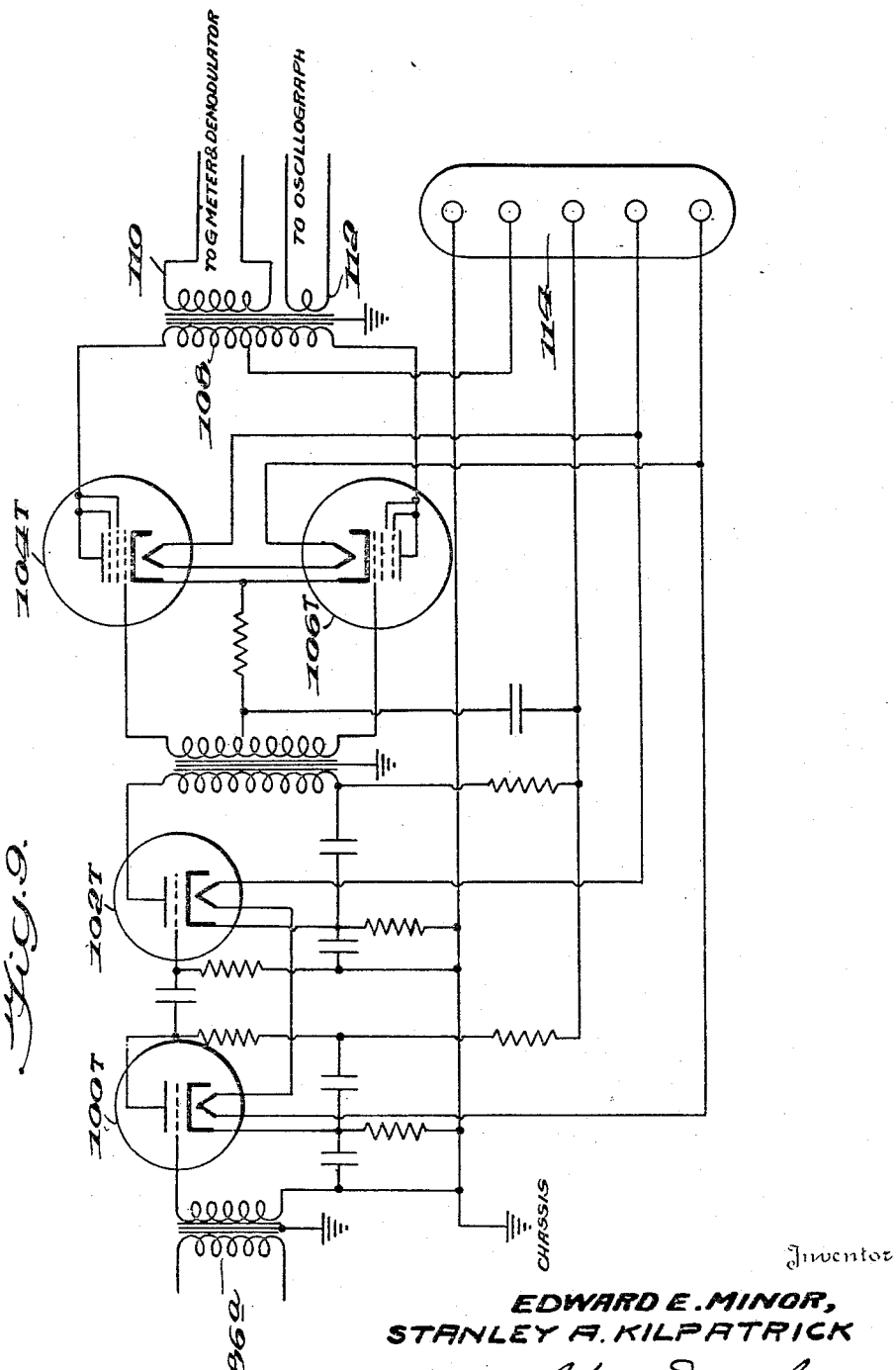

Dec. 15, 1942.    E. E. MINOR ET AL    2,305,267
VIBRATION MEASURING APPARATUS
Filed Aug. 5, 1939    10 Sheets-Sheet 6
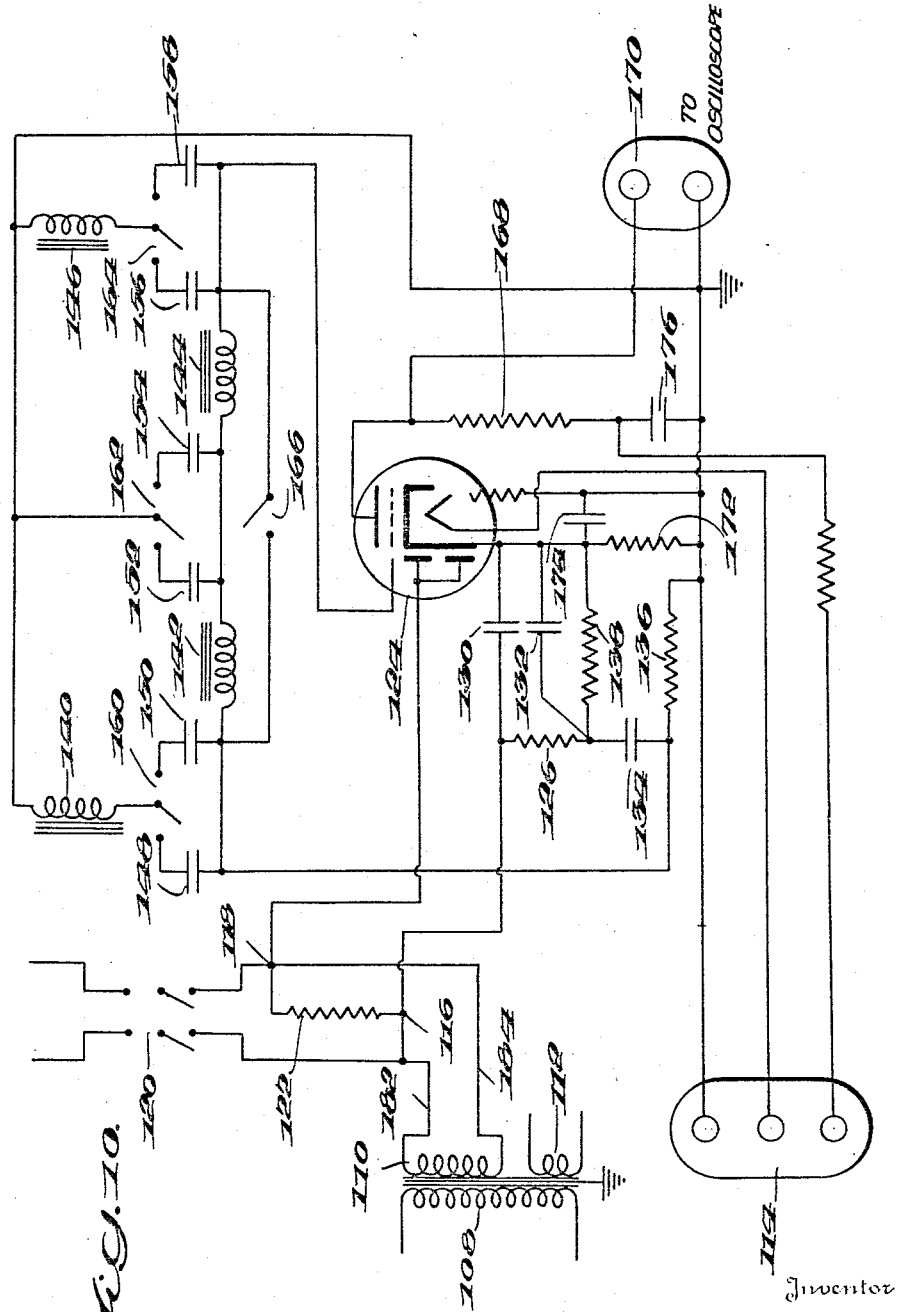
Inventor
EDWARD E. MINOR,
STANLEY R. KILPATRICK
By Hanson Bates
Attorney

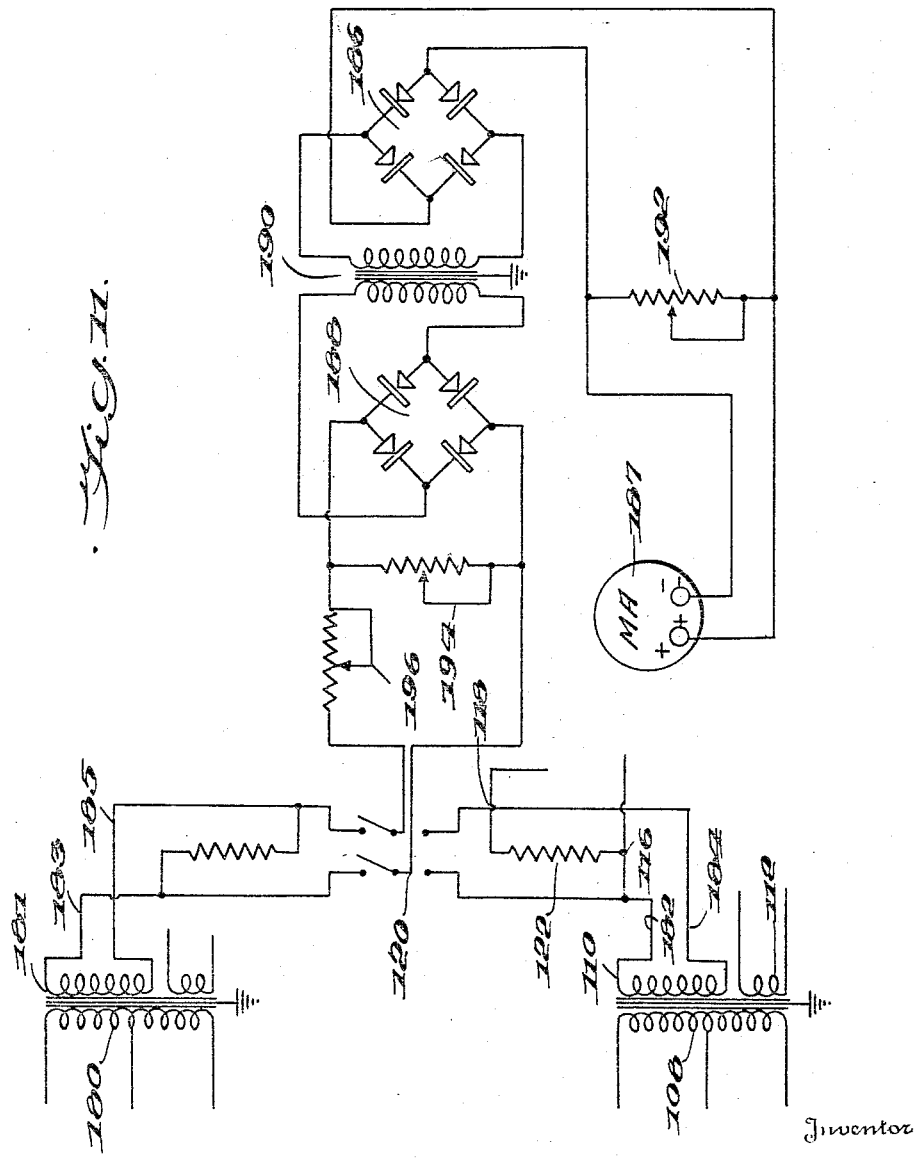

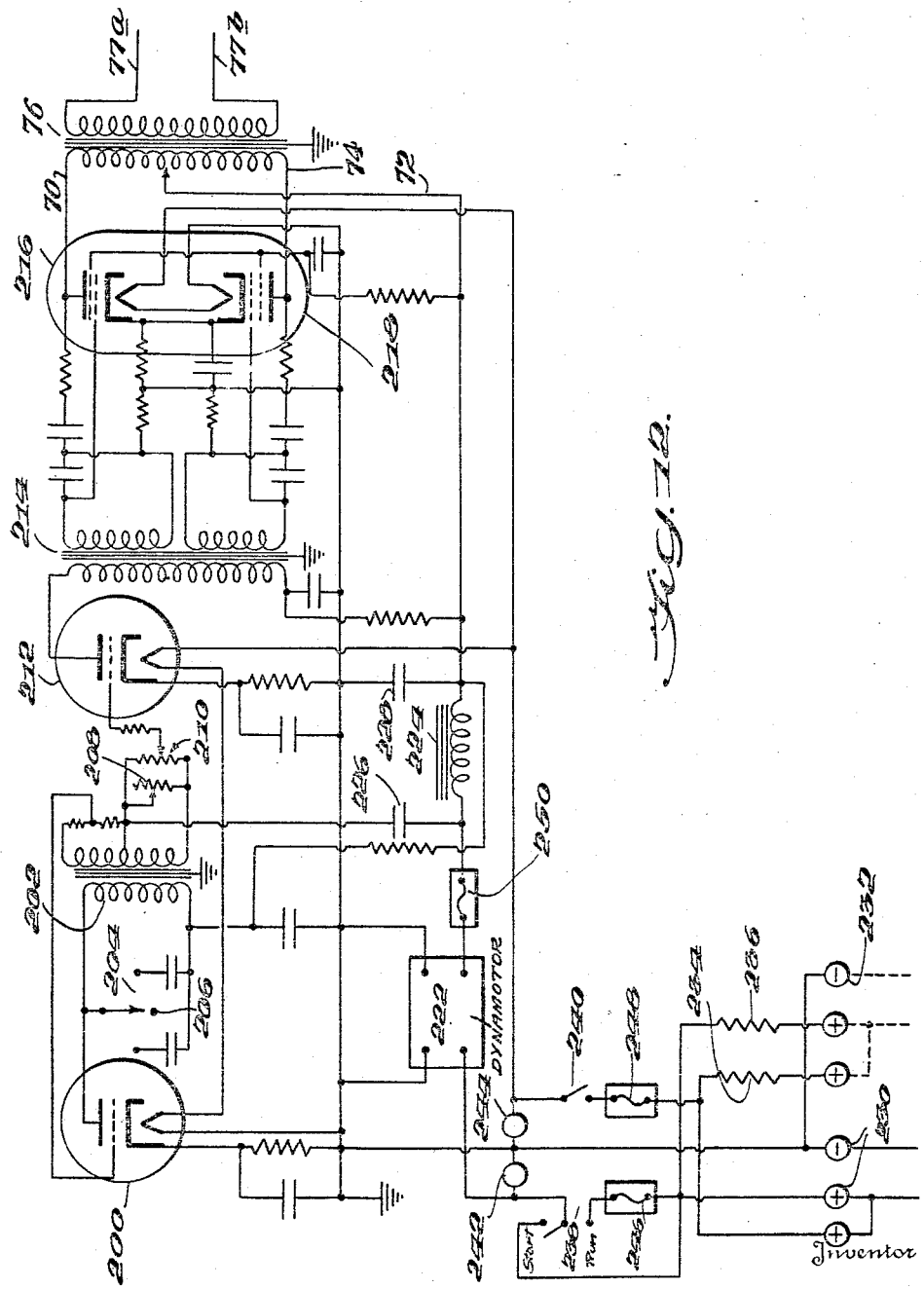

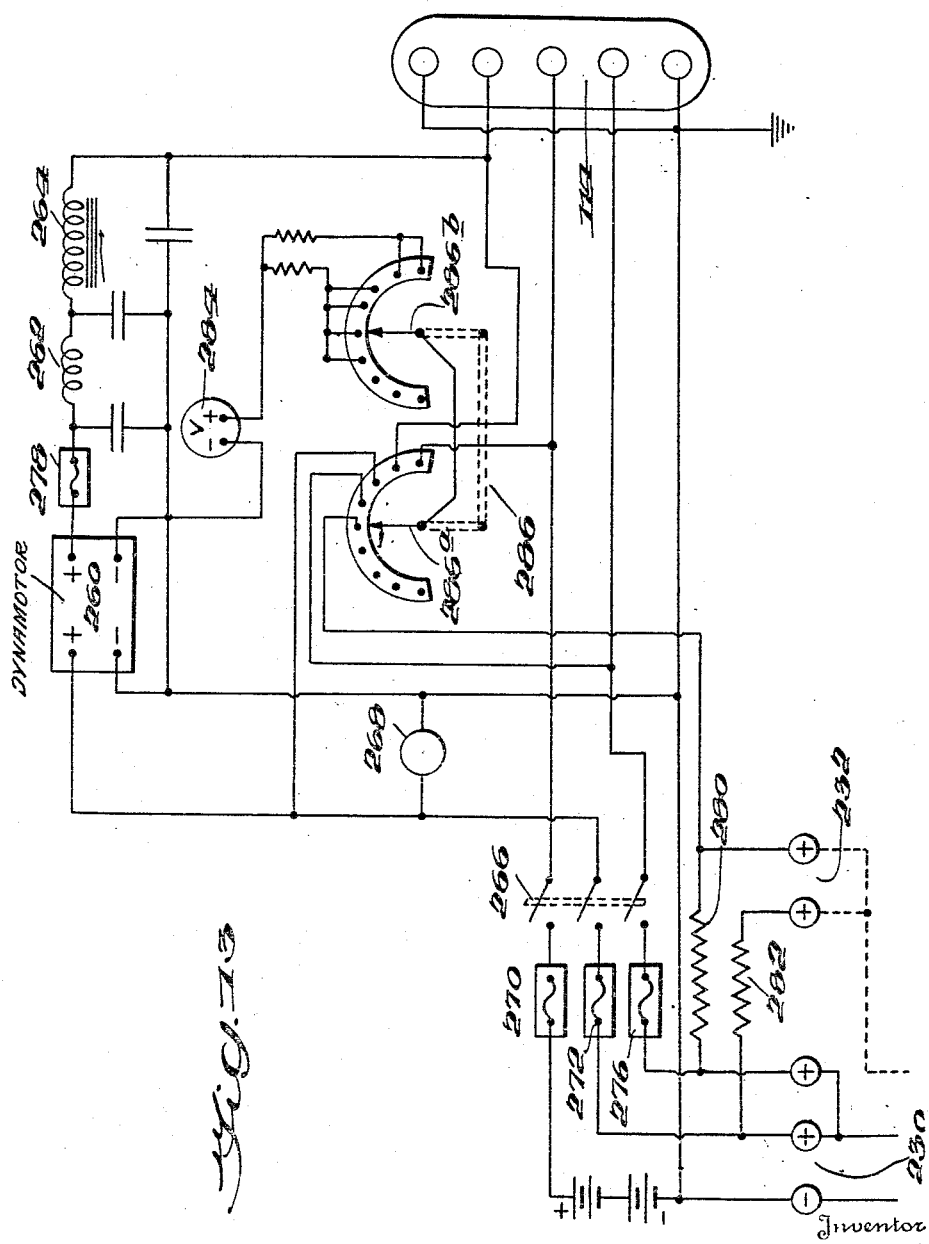

Dec. 15, 1942. E. E. MINOR ET AL 2,305,267
VIBRATION MEASURING APPARATUS
Filed Aug. 5, 1939 10 Sheets-Sheet 10

*Fig. 14a.*
Sinusoidal Acceleration Acting On A Pick-Up Unit

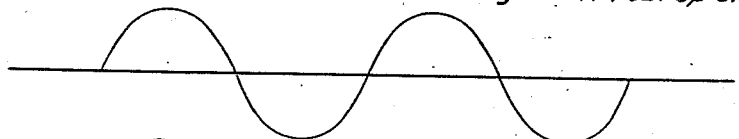

*Fig. 14b.* Carrier Frequency Voltage For Completely Balanced Operation

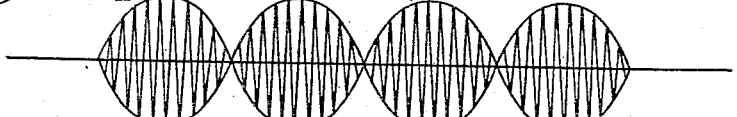

*Fig. 14c.* Voltage Output Of Demodulator For Completely Balanced Operation.

*Fig. 14d.* Carrier Frequency Voltage For Completely Unbalanced Operation

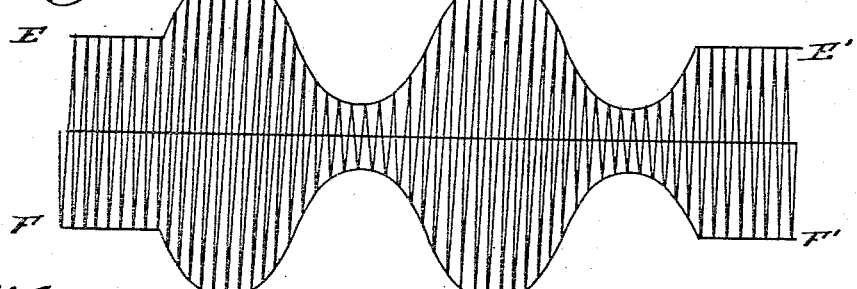

*Fig. 14e.* Voltage Output Of Demodulator For Over-Modulated Operation

*Fig. 14f.* Carrier Frequency Voltage For Over-Modulated Operation

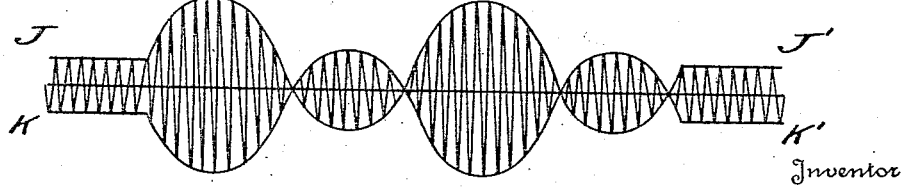

Inventor
EDWARD E. MINOR,
STANLEY A. KILPATRICK
By
Attorney

Patented Dec. 15, 1942

2,305,267

UNITED STATES PATENT OFFICE 2,305,267

VIBRATION MEASURING APPARATUS

Edward E. Minor, Baltimore, and Stanley A. Kilpatrick, Raspeburg, Md., assignors to The Glenn L. Martin Company, Baltimore, Md.

Application August 5, 1939, Serial No. 288,530

9 Claims. (Cl. 73—51)

This invention is directed to the measurement of vibrations taking place in structures, and is particularly directed to the measurement of vibrations in aircraft for the determination of critical flying speeds thereof.

This application is a continuation-in-part of our parent application Serial No. 214,562, filed June 18, 1938.

In the parent application, an apparatus was disclosed which measured the vibrations taking place in structural members by means of carbon pile pick-ups, the current pasing through the pick-ups being a measure of the accelerations of the vibrations because of the variations caused in current flow by the change in resistance taking place in the pick-ups because of the accelerations. Such modified electric currents, after being properly amplified and filtered were projected upon an oscilloscope screen, or recorded upon an oscillograph, from which the type and magnitude of the vibrations measured could be determined.

It is an object of the instant invention to improve upon the type of pick-up apparatus used to amplify and record the electrical impulses produced by the pick-up device.

A further object of this invention is to produce a pick-up device which is sensitive to low frequency vibrations of the type to be measured, while, at the same time, being accurately responsive to these vibrations.

Another object of the invention is to construct an induction type pick-up which accurately responds to and is sensitive to vibrations taking place within the audio-range.

A further object of the invention is to produce an amplifying, filtering, and recording apparatus, which handles without distortion the current frequency modulated by the action of an induction type pick-up.

Generally these objects of the invention are obtained by constructing a pick-up device consisting of a weight relatively movable under the influence of vibrations, and located within the flux field of energized coils. The frequency of the current passing through the coils is modified by the variation of inductance produced therein by the relatively movable weight. This modulated frequency is then amplified, filtered, and demodulated, the demodulated frequency being applied to an oscillograph and/or an oscilloscope. The pick-up unit is constructed so that it is very sensitive to both the frequency and the degree of acceleration of the vibrations to be measured. The improved apparatus is so constructed as to eliminate various harmonics, resonances, and other disturbances which would inaccurately influence the demodulated current passed therethrough to the measuring apparatus.

These and other objects of the invention may be more clearly understood by reference to the accompanying drawings, in which:

Fig. 2 is a side view of one of the novel pick-up units.

Fig. 3 is a plan view of Fig. 2.

Fig. 4 is an enlarged longitudinal section of the cable used in the cable leads for the pick-up device.

Fig. 5 is a cross-sectional view of the pick-up device on the line 5—5 of Fig. 3.

Fig. 6 is a greatly magnified view of the central portion of Fig. 5 showing the details thereof.

Fig. 7 is a cross sectional view on the line 7—7 of Fig. 5.

Fig. 8 is a wiring diagram showing the bridge circuits and switches diagrammatically indicated in Fig. 1.

Fig. 9 is a wiring diagram showing the high frequency amplifier circuit for either the horizontal or vertical channel diagrammatically indicated in Fig. 1.

Fig. 10 is a wiring diagram showing the demodulator and the filter circuit for either the horizontal or vertical channel shown in Fig. 1.

Fig. 11 is a wiring diagram showing the "G-meter" circuit diagrammatically illustrated in Fig. 1.

Fig. 12 is a wiring diagram showing the oscillator diagrammatically indicated in Fig. 1 for supplying carrier frequency to the apparatus.

Fig. 13 is a wiring diagram showing the power supply circuit diagrammatically illustrated in Fig. 1 for supplying power to operate the amplifiers, and Figs. 14a to 14f, inclusive, are curves illustrating various modes of operation of the apparatus.

Figure 1:
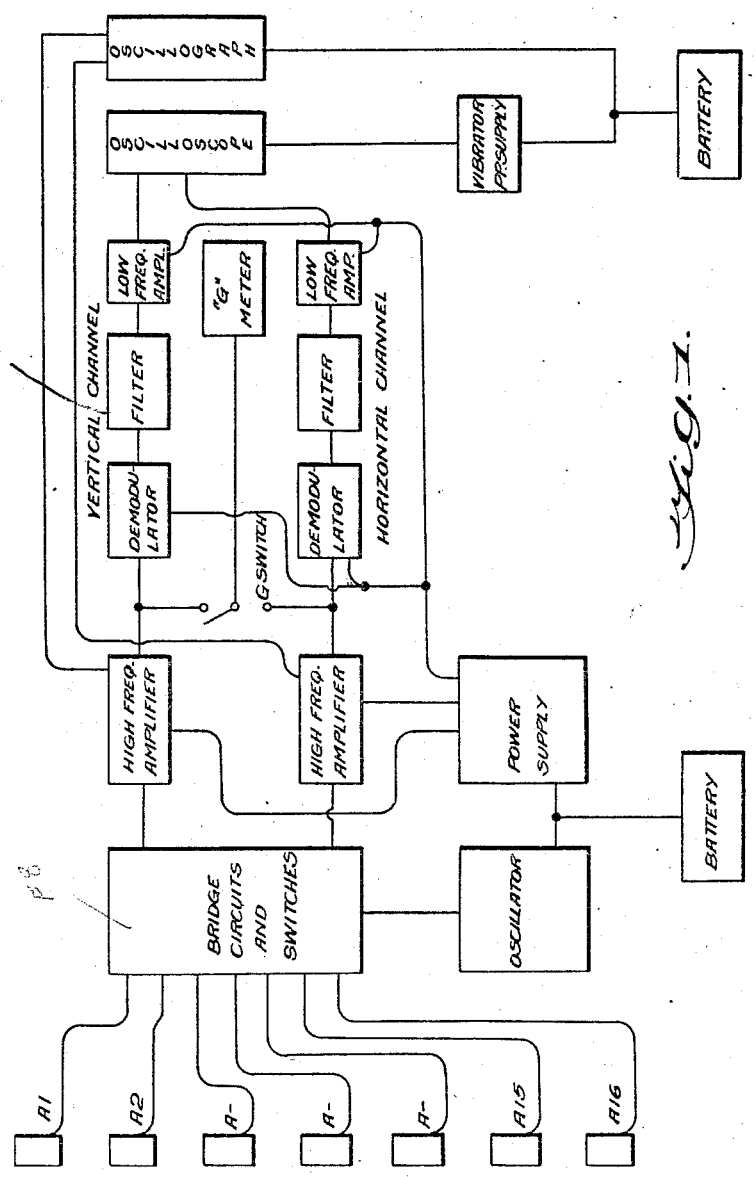
Fig. 1 is a diagrammatic chart showing the relationship of the various parts of the apparatus to each other.

In Fig. 1, the pick-up units are indicated at $A^1$, $A^2$—$A^{16}$. These units are placed upon the structure to be analyzed, and when the various structural parts to which they are fixed vibrate, the accelerations cause a modification in the electrical curents being passed through the individual pick-ups. The currents from various pick-ups are combined in the bridge circuit and switch device from which the currents are passed through the various amplifiers to modulators and filters until the demodulated currents reach the oscilloscope or oscillograph.

The pick-up unit which is referred to above is a mechanism by which accelerations imposed thereon produce a relative movement between an inductor and the frame of the pick-up unit which in turn causes changes in the inductances of two built-in coils; the inductances of one coil being increased as that of the other is decreased and vice versa. By means of additional equipment connected in a suitable electric circuit these changes in the inductance of the pick-up coils are effective in varying an electric voltage, with an associated electric current, in a manner representative of the initial mechanical acceleration of the structural part being analyzed.

Referring back to Fig. 1, the relation of the pick-up units to the general circuit becomes more apparent. In actual use, pick-up units A1 to A16 would probably be located some distance from the centralized measuring equipment, connection cables 70 feet long having been used. There is no practical limit to the length of cable which may be used. Housed in the centralized measuring equipment and corresponding to each pick-up unit is an electrical bridge circuit, which will be more fully described with reference to Fig. 8. Alternating current at audio-frequency is supplied to the bridge circuits by an output oscillator. This impressed frequency is referred to as the "carrier." The output voltage of each bridge circuit is determined by the voltage of the impressed carrier and by the degree of balance of the bridge circuit. This factor of bridge balance is directly affected by the position within the pick-up of its inductor, which in turn is controlled by the mechanical accelerations being imposed on an individual pick-up unit. Therefore the output voltage of each bridge circuit will consist of a carrier frequency component which is modulated in accordance with the mechanical acceleration to be measured.

The voltage output from the bridge circuit is amplified at one or the other of the two "high frequency amplifiers." Beginning with these amplifiers, it will be noted from Fig. 1 that there are two duplicate sets of equipment forming two separate and independent channels which feed the oscilloscope. One is termed the "vertical" channel because it controls the vertical set of deflection plates in the cathode ray tube, while the other is termed the "horizontal" channel because it controls the horizontal set of deflecting plates.

The unit which contains the sixteen separate bridge circuits is provided with suitable switches so that the output from any one of the pick-ups may be fed into either of the amplifier channels. In addition to the selective operation of any pick-up unit into either channel, the switching facilities also make it possible to secure the following results by direct observation:

(a) Determine the vector sum of two or more pick-up accelerations directly combined and fed into one or the other of the amplifier channels.

(b) Under (a) above, the phase of any of the pick-up outputs may be changed by 180° so that the vector differences are obtained.

(c) By using both amplifier channels simultaneously the phase relationship between any two pick-up accelerations, of the same frequency, may be determined.

(d) The methods of (a) or (b) above may be combined with (c) to determine the phase relationship existing between the vector combination of accelerations expressed by one group of pick-ups and the output from a separate single pick-up or from a group of pick-ups.

As described above, the two output circuits of the bridge and switching mechanism are connected to the horizontal and vertical high frequency amplifiers. The high frequency designation is used because the voltages to be amplified are all at carrier frequency, or, to be exact, they occupy the band between the carrier frequency plus vibration frequency, and carrier frequency minus vibration frequency. This, as will be explained later, permits important simplifications and economies in the construction of the amplifier.

Each of these amplifiers contains two gains, or stages which build up the voltages, followed by a power output stage of amplification. The power output stage is intended to operate an electromagnetic oscillograph to obtain vibration records on film if desired. These records would be somewhat unconventional in appearance because of the presence of the carrier frequency. The film speed would be adjusted to a value which would bring out the shape of the vibration phenomena. Since these phenomena are of relatively low frequency as compared to the carrier, it follows that the film movement would be too slow to resolve the transverse motions of the light beam at carrier frequency into separate traces on the film. Therefore a solid or block pattern would result. The fixed amount of unbalance in the pick-up bridge circuit would lead to an oscillograph input of carrier frequency current having a constant maximum value. This would produce a solid block trace on the film of constant amplitude or height. If the amount of unbalance in the bridge circuit is varied by the pick-up in response to imposed mechanical accelerations, amplitude of the block trace will be varied as the film moves along so that the profile of the trace will show the mechanical acceleration.

In addition to the provision for obtaining photographic records from an oscillograph, the apparatus permits the obtaining of immediate visual indications of the accelerations expressed by the pick-up units. Such visual indications are of the greatest importance in making flutter tests of aircraft where the information is needed before time can be taken to develop film from the oscillograph. Two kinds of visual indicators are used as shown in Fig. 1. One is a conventional oscilloscope known conventionally as a "cathode ray oscilloscope," and the other is a "D'Arsonval" indicating instrument which comprises a D. C. microammeter connected to a special circuit in such a way that its indications are approximately proportional to the average accelerations, or "g" which are being imposed on the connected pick-up unit. Accordingly, this latter instrument is termed a "G-meter" as legended upon Fig. 1. In Fig. 1, a selector switch labeled "G-switch" is used to connect the G-meter to either the horizontal or vertical channel.

Fig. 1 further shows a demodulator, filter, and low frequency amplifier interposed between each high frequency amplifier and the deflecting plates of the cathode ray tube in the oscilloscope. In the demodulator, the carrier frequency is suppressed and the modulation components representing the original mechanical vibrations are passed on to the filter. Demodulation serves two purposes: (a) It leads to a single line pattern on the oscilloscope rather than a block pattern of the type disclosed in connection with the electromagnetic oscillograph; and (b), demodulation also permits the use of a filter.

The output of the demodulator contains the electrical representation of all the mechanical accelerations falling within the range, and directed along the sensitive axis of the particular pick-up being analyzed. These accelerations may be so numerous and of such widely different frequencies that a simultaneous viewing of them all on the oscilloscope screen would be very confusing. For example, in making flutter measurements in an aircraft, the presence of high frequency accelerations due to engines, for example, would be superfluous and objectionable. The filter is therefore included. This unit readily passes on the low frequency phenomena which are important in making a flutter investigation, but the high frequency phenomena are so strongly attenuated that they are rendered negligible. The filter thus described and as used is a low pass filter. However, a high pass filter, or a band rejection filter could be used as well. A high pass filter would be appropriate if it were desired to eliminate indications due to low frequency phenomena and to focus attention on high frequency phenomena. A band pass filter has both an upper and a lower frequency limit, making it possible to concentrate attention on the phenomena occurring when frequencies lie between the upper and lower limits of the band pass filter, high and lower frequencies outside the limits of the filter being suppressed. The band rejection filter is exactly the converse of the band pass filter as it has both high and low frequency limits, and frequencies falling within these limits are suppressed, while all other frequencies are passed.

The output of the filter goes through a low frequency amplifier before being applied to the deflecting plates of the oscilloscope. This low frequency amplifier is used to obtain a voltage sufficient to operate the oscilloscope properly, without the necessity of working with excessively high voltages in the demodulator and filter units. However, the gain in the low frequency amplifier is held to the necessary minimum because of the difficulty of extending the region of uniform gain into the region of low vibration frequencies which the equipment is intended to cover. Amplification without discrimination against the extremely low vibration frequencies, in the range of 60 to 600 cycles per minute is readily accomplished in the high frequency amplifier, but after the demodulator has removed the carrier frequency, any further amplification must cover the entire range of the mechanical vibration frequencies which the equipment is being used to measure. Because of this necessity for covering a range of frequencies which includes very low frequencies, it follows that for a given amount of amplification, a low frequency amplifier would be more expensive and also more bulky than a high frequency amplifier for the modulated carrier current which would give an equal amount of gain.

The oscilloscope unit is of the conventional type and is equipped with a variable frequency saw-tooth oscillator which can be switched onto the horizontal deflecting plates of the cathode ray tube to provide a means of obtaining a stationary trace on the projection screen of the oscilloscope. This can be done only for recurrent phenomena, and the necessary condition for a stationary trace is that the saw-tooth oscillator be adjusted to the same frequency as that of the phenomena which are affecting the vertical deflecting plates of the cathode ray tube. This effect is used as a means of evaluating the frequency of the observed phenomena. The frequency control of the saw tooth oscillator is calibrated in terms of cycles per minute so that as soon as it has been adjusted to obtain a stationary trace on the screen, observation of the control setting gives a direct reading of the frequency.

In addition, the oscilloscope is equipped with two built-in amplifiers, each of which is provided with a gain control so that the amplification factor may be varied from zero to maximum. One of these amplifiers operates in the vertical channel and the other in the horizontal channel. This is a conventional arrangement in standard oscilloscopes, but in the instant apparatus the arrangement is special in that the amplifiers are designed to operate at very low frequencies. Furthermore, these amplifiers may be cut out of the circuit so that a direct connection from the low frequency amplifier to the deflection plates of the cathode ray tube may be obtained. This does away with any low frequency limitation to the oscilloscope amplifiers. However, for normal operation, their low frequency characteristic is satisfactory, and in normal operation these amplifiers are used. This oscilloscope has been further modified from standard or conventional by the addition of two large accurately graduated dials used for the vertical gain control and for the frequency control of the saw-tooth oscillator.

In addition to these principal items of the apparatus which have just been described, certain auxiliary items are indicated in Fig. 1. First of these is the oscillator which operates the carrier frequency current used to energize the bridge circuits into which the pick-up units are connected. This unit requires a source of electric power for its operation as well as do the amplifiers and demodulator units. As the apparatus is primarily intended for use in an aircraft while the aircraft is in flight, arrangements are made for the supply of all necessary power from storage batteries which may or may not be connected to the generators and electrical system of the aircraft. The power supply is therefore continuous current at 12 volts. 24 volts may be used as will be later explained in the description of the oscillator and power supply units.

In order to apply the high voltage continuous current required by the amplifiers, one of the auxiliary units is necessarily the power supply unit indicated in Fig. 1. This unit contains the dynamotors used to secure the high voltage, and the filter equipment for the purpose of removing the ripple voltages produced by commutation. The oscillator and power supply are operated from a common battery which therefore supplies all the equipment except the oscilloscope and the oscillograph.

In the use of a conventional oscilloscope with the apparatus, A. C. at 110 volts, 60 cycles must be supplied. As shown in Fig. 1, a vibrator power supply is connected to the battery feeding the oscilloscope and oscillograph. This vibrator power supply is also a commercial and conventional piece of equipment and is used to convert low voltage D. C. battery power into 110 volts, 60 cycles A. C. Of course the electrical system of the aircraft may be substituted for the battery. Use of this second battery helps to reduce the drain on the battery feeding the oscillator and power supply previously described, and also prevents disturbances associated with the vibrator from affecting the oscillator and amplifiers. This battery can also be used for operating the electromagnetic oscillograph.

In Figs. 2 to 7, the structure of the pick-up unit is shown. A non-magnetic casing 2 encloses the operating mechanism, said case having a base 4 which is adapted to be bolted, or screwed, to a member the vibrations of which are to be studied. From a protecting cap 6 bolted at 8 to casing 2, tube 10 extends and forms a protective conduit for cable 12 which is composed of three insulated wires 70, 72, and 74, surrounded by a wire braid 14, Fig. 4, over which lies another insulating coat 16. Clip 13 holds cable 12 against movement within tube 10. The wire braid shields the cable against any inductances which could influence the electrical currents passing from the pick-up device to the switching apparatus. Each pick-up is located at a different position in an aircraft to be tested. The wires in cable 12 are joined to connecting leads which extend to the switching mechanism placed in a central location as in the cabin of an aircraft. When cable 12 is connected to the leads of the switching mechanism, a slidable shield 18 consisting of metallic braid is slid over the joint, thus shielding the joint against outside influences. After the pick-up has been installed, the metallic braid 14 is grounded to the structure being tested, thus increasing the effectiveness of the shield.

The details of the pick-up are more fully illustrated in Figs. 5, 6 and 7. In Fig. 5, a ring-shaped ferrous mass 20 having the form of an I in cross-section, has a circular metallic disc 22 fitted to each side thereof. This mass lies inwardly of brass ring 24. The open ends of ring 24 are closed by copper beryllium spring discs 26, against which the central portion 28 of mass 20 bears. Secured to mass 20 on the outer faces of the discs 26 are second metallic masses 30 which function as poles. These poles are secured to the central mass by a pin 32. Second brass rings 36 lie above and below the central ring 24, and clamp the peripheries of discs 26 between rings 24 and 36. Rings 36 have inwardly directed flanges 38. Phenol fibre spools 40, on which are wound coils 42 are held against flanges 38 by plates 44 and 46 which cover the top and bottom of this assembly, these plates being clamped together by bolts 48 placed outwardly of rings 24 and 36. Plates 44 and 46, respectively, carry poles 50 threaded into projections 51 on the plates, poles 50 being adjustable to or from masses 30. Mass 20 lies within the flux field of coils 42. Poles 50, after being adjusted, are locked in position by screws 52. Plate 44 is of sufficient diameter to extend to the outer edge of a securing flange 53 surrounding casing 2, whereby the plate is secured to casing 2 by bolts 8 which also secure the cap 6 to casing 2. Between plate 44 and cap 6 is located an insulating member 54 which supports binding posts 56. Leads 58 from coils 42 are secured to these binding posts.

Ring 24 is drilled at 60, and rings 36 are drilled at 62 to provide fluid passages. After the device is assembled, it is evacuated and filled with a non-compressible fluid, with a nearly constant viscosity over operating temperature range, by a convenient means as through a plug in the wall of casing 2, not shown. As more clearly shown in Fig. 6, spring discs 26 are slightly deflected from their normal position by the central portion 28 of mass 20. That is, the discs are constructed as being flat, but in assembling the pick-up, the central portion of the discs is deflected approximately 0.002 inch. This initial straining of the discs is considered important. As the portion 28 of mass 20 moves in response to accelerations, an inaccurate response to vibrations of low magnitude would occur if both discs passed through their central flat position at the same time, and this would be particularly true for accelerations of low magnitude. By initially placing discs 26 under tension, and concave toward each other, the two discs never pass through their center, neutral, or flat position at the same time, inasmuch as the mass 20 must deflect several thousandths of an inch before either disc can pass through a flat condition.

The operation of the pick-up device to measure accelerations is as follows:

An alternating current functioning as a carrier current is supplied from the oscillator diagrammatically indicated in Fig. 1 to coils 42, which are connected in series opposition through leads 58 to cable 12. Before final assembly of the unit, pole pieces 50 are adjusted and locked in place in order to set the proper air gap between them and poles 30, this setting the amount of inductance that can be obtained in coils 42. As a mass 30 approaches an adjacent pole 50 on one side of mass 20, the corresponding poles on the opposite side of the mass become further apart. Changes in the respective air gaps between adjacent masses 30 and poles 50 causes a change in the reluctance of a magnetic circuit existing between the coils 42 and the mass 20, and a corresponding change in the inductance of each of the two coils.

The inductive reactance of any coil is equal to the product of its inductance by $2\pi$ times the frequency of the alternating voltage applied. The inductance is proportional to the amount of flux produced by a given current in the magnetic circuit associated with the particular coil, and this flux in turn is inversely proportional to the reluctance of the magnetic circuit. Therefore it is apparent that the motion of the inductor relative to the frame (in response to acceleration imposed on the pick-up) results in changes in the inductance and reactance of both the upper and lower coils. These changes occur in such a manner that as one coil has its reactance increased by the approach of the inductor, the other coil is experiencing a decrease in inductance (and reactance) due to the increasing separation from the inductor.

The provision for adjustment of the pole pieces serves two purposes. First it provides a means of making the reactances of the two coils equal. This is of considerable importance in securing a 1:1 balanced bridge circuit for convenience in switching and combining indications as will be discussed later. Secondly, the pole piece adjustment provides a means of varying the sensitivity. The maximum pick-up sensitivity occurs for a small gap separation, but when the pick-up is to be subjected to large values of excitation which would produce correspondingly large values of inductor displacement it is necessary to sacrifice sensitivity to some extent and increase the gap separation in order to avoid actual striking of the pole pieces.

Thus, an alternating modulation of the carrier frequency primarily supplied to the coils 42 is produced. After adjustment, the assembly is completed, dampening fluid placed in the unit, and the unit is then secured to a structural part whose vibratory motions are to be studied. Movement of the structural part creates movement in the unit because of the inertia of mass 20. This movement of mass 20 is damped by the flow of the fluid which must pass through ports 60 and 62, respectively, as the spring discs 26 are deflected.

The use of two diaphragm springs 26 with precisely fixed radial location is very important because it very effectively provides selective response. That is, the only motion possible between the inductor and the surrounding frame is pure axial displacement. Therefore, of all the random accelerations which may be imposed on the pick-up, only those components of acceleration which are directed along the axis of the unit will be effective in producing motion of the inductor and response of the entire equipment. It is obvious that this property of selective response is indispensable in making any analysis of an unknown and complex motion.

The use of the fluid not only prevents excessive amplitudes of movement of the mass, but prevents the inductor system from vibrating at its natural resonant frequency in response to any random or shock excitation which may be imposed upon the pick-up. Again, large amplitudes of spring deflection are eliminated which would lead to the failure of the springs from fatigue.

The range of frequencies over which the inductor type pick-up has been experimentally used extends from about 30 cycles per minute up to approximately 4500 cycles per minute. These figures, however, do not constitute either an upper or lower limit of usefulness. The inductor pick-up is designed to operate as an accelerometer; that is, the displacement of the inductor relative to the frame of the pick-up is designed to be proportional to the acceleration which is imposed on the pick-up as a unit.

Deviations from this "ideal" characteristic become more and more pronounced as the frequency of the imposed mechanical vibration is increased from zero frequency toward the natural resonant frequency of the inductor (or moving mass which is supported on a system of springs within the pick-up).

Theory indicates however that the use of "viscous" damping amounting to 62% of the critical value will result in a deviation from the "ideal" characteristic of less than ±3% for any frequency within the range from zero to 75% of the natural resonant frequency of the inductor system. The upper frequency limit of pick-up usefulness is therefore related to the natural resonant frequency of the inductor system. For the pick-up units actually in use, this natural frequency was designed to be 12,000 cycles per minute. In principle the upper limit can be extended almost indefinitely by the use of stiff springs and a small mass. On this basis the theoretical ultimate upper frequency limit of pick-up usefulness should not be less than 1,000,000 cycles per minute. On the other extreme there is no theoretical lower limit of frequency response for the accelerometer.

However, because of the fact that the sensitivity of an accelerometer varies inversely as the square of the natural frequency, this consideration of sensitivity usually sets a practical upper limit for the natural frequency of the moving system (i. e., the inductor system in the case of the subject pick-up). Considering only the response to accelerations, of the pick-up unit per se, practice coincides with theory and there is no low frequency limitation. However, because of the electrical amplifiers used in the present equipment, the entire arrangement of equipment does begin to lose sensitivity at frequencies lower than 60 per minute although good response is available even down to, and somewhat below 30 per minute.

The preceding discussion of sensitivity is on the basis of response to acceleration. In normal usage these accelerations will be produced by periodic displacements (of the structure or part to which the pick-up is attached) from a neutral or "at rest" position. In this connection, since the maximum value of acceleration associated with a sinusoidal motion is proportional to the product of the maximum amplitude of displacement and the square of the frequency it follows that the sensitivity of even an "ideal" accelerometer device to periodic displacements is inversely proportional to the square of the frequency. Hence, if the "useful range of frequency" for the subject pick-up and equipment is discussed from the standpoint of possessing sufficient sensitivity to give a useful response, a great deal will depend upon whether sensitivity to displacement is intended, or sensitivity to acceleration. In principle the response of the entire equipment to acceleration can be made essentially uniform over a frequency range extending from any low frequency other than zero up to at least 1,000,000 cycles per minute. However, due to the inherent characteristics of even an "ideal" accelerometer, the response as related to periodic displacements will be very great at high frequency, decreasing to zero at zero frequency.

There is another factor, which is very elementary, but absolutely basic in any practical discussion of the useful range covered by the pick-up and apparatus. The apparatus will be useful in observing and measuring a given vibration only when the frequency lies within the working range, and also when the magnitude of the accelerations associated with the vibration is sufficient to produce a proper response of the apparatus, without being so great as to damage the apparatus. This question of combining sufficient sensitivity with adequate ruggedness is of more practical than theoretical importance. In point of fact, the apparatus is so rugged that pick-up units tested under severe vibration amounting to over 100 times the acceleration of gravity were undamaged. At the same time sensitivity is such that 0.02 times the acceleration of gravity is sufficient to give usable indications.

Fig. 8 illustrates the wiring system for the bridge circuits and switches shown in Fig. 1. A transformer 76 which is in the output circuit of the oscillator, Fig. 1, and which is supplied with current in a manner to be described below, in connection with Fig. 12, represents the source of carrier frequency current to the bridge circuits. The exact value of carrier frequency voltage applied to the bridge circuit is important because the output voltage of the bridge is proportional to the product of the input voltage and the degree of unbalance present in the bridge. Therefore, two potentiometers marked Co for coarse and Fi for fine are shown in Fig. 8 series connected to the secondary of transformer 76. These two potentiometers enable accurate adjustment to be made, while the volt meter 78 gives the actual value of the voltage applied. Leads 77a and 77b, the Co and Fi potentiometers, and volt meter 78 are common to all pick-up units A1 to A16, inclusive, Fig. 1. Individual circuits for but two units are shown for purposes of example in Fig. 8.

A switch 80 connects the bridge circuit for one pick-up unit, for example unit A1 of Fig. 1, to leads 77a and 77b, and makes or breaks contact between the bridge circuit and the oscillator voltage. Switch 82 is a reversing switch for altering the phase of the carrier input by 180°. Switch 84 is a double pole, double throw, center off, three position switch connecting the bridge to transformer 86, composed of parts 86a and 86b. Thus the switch connects the output of the bridge through leads 85a to the vertical channel high frequency amplifier through transformer 86a, or to the horizontal channel through leads 85b and transformer 86b, or isolates the bridge output from both channels.

The bridge proper has two ratio arms with a single common adjustment constituting the potentiometer 88. Fixed resistors 90 and 92 comprise a large percentage of the resistances in each arm to make the resistance in each arm constant, and thereby reduce the delicacy of the adjustment required in the potentiometer 88 in order to secure a balance of the circuit. An individual pick-up is represented by two inductances such as 95 and 97 which form the principal parts of the two variable arms. These inductances are, of course, the two coils 42 built into the pick-up 2, and connected to the bridge circuit through the leads 70, 72 and 74.

The movable pole pieces described in connection with the pick-up unit 2 are adjusted so that the inductance of the lower coil exactly matches that of the upper coil when the pick-up unit is at rest. Subsequently in balancing the bridge circuit, the potentiometer 88 is adjusted so that the 1:1 inductance balance in the pick-up is matched by a 1:1 resistance balance of the ratio arms. This condition is termed a "magnitude balance" of the bridge circuit but does not represent a completely balanced condition which would correspond to a no-voltage output regardless of the amount of input voltage applied. The remaining balance condition is termed "phase balance." The two balance requirements, "magnitude" and "phase," arise from the fact that the pick-up coils function in the electric circuit both as inductances and pure resistances, and neither solely as a pure inductance or a pure resistance. The inductance effect is due to the magnetic flux which links each coil 42, and the resistance effect is due partly to the ohmic resistance of the copper wire used in the windings and leads, and partly to the losses which arise from the reversals, or alternations of the magnetic flux occurring in response to the alternating current applied to the bridge circuit.

The wirings and magnetic circuits used for both upper and lower coils in each pick-up 2 are made as nearly identical as possible. In fact, the magnetic circuits are adjusted by means of the movable pole pieces 50 so that the inductances of the coils are identical. No means, however, is built into the pick-up unit for making the loss or resistance effects of the two coils absolutely identical. Such is accomplished by means of a variable resistor or phase balance control 94 which is in series with one of the two pick-up coils. By experiment the proper connections of the pick-ups are determined so that this phase balance control 94 will be in series with the coil of the pick-up having the smaller effective resistance. The resistance introduced at 94 is adjusted until it is just sufficient to make up the deficiency existing in the low resistance coil. Thus by means of two adjustments, the pick-up coils are simultaneously brought into a 1:1 relationship with each other, and both their phase or resistance components and their magnitude or inductance components are made identical to produce a complete balance of the bridge circuit with the corresponding adjustment of the ratio arms into a 1:1 relationship.

This balance condition holds only so long as the pick-up unit is at rest. As soon as the pick-up unit experiences an acceleration which moves the inductor mass 20, the balance between the coils is disturbed and their inductance and therefore their reactance are no longer the same. Consequently, a voltage difference appears between the mid-point of potentiometer 88 and the common lead 72 of the two coils. This voltage is applied to the resistors 96 and 98 connected in series. Resistors 96 and 98 constitute, in effect, a potentiometer, and the voltage across resistor 96 is applied through switch 84 to transformers 86a or 86b which feed the high frequency amplifiers. By adjusting resistor 98 to zero resistance the total amount of unbalance voltage is applied to transformer 86, but when resistor 98 is adjusted to its maximum value which just equals the resistance of resistor 96, transformer 86 receives only half of the unbalance voltage which is developed. Hence resistor 98 serves as a "sensitivity control" for varying the bridge output for a given acceleration over a range of 2:1.

The bridge circuit for a single pick-up 2 has just been described. In Fig. 8 the bridge circuit for a second similar pick-up having coils 95a, 97a is also shown. It is identical with that for the first circuit just described and the corresponding elements have like reference characters with the subscript a. Leads 77a and 77b from the transformer 76 are common to the bridge circuits for each individual pick-up. An apparatus which has been actually used has contained a total of 16 pick-ups and associated bridge circuits. Of course, the number of pick-up units with their corresponding bridge circuits may be varied without limit. As the description of one bridge circuit serves for any number of identical bridge circuits, no further bridge circuits are described. It is noted, however, that the proximity of the various components of a plurality of circuits, as well as of the wires, would provide capacity coupling between the circuits and lead to objectionable interaction therebetween if very thorough shielding were not employed. Consequently, metal panels and boxes are used to house the apparatus, and the components of each individual bridge circuit are grouped as compactly as possible and are surrounded by metallic shields from adjacent circuits. Shielded lead wires, connection with metallic bodies, blocks and connection cable with metallic shield braid, also contribute to the thorough isolation of the individual circuits.

All of the above mentioned shields are grounded to the metal boxes housing the equipment, all of which are connected together, and, of course, each and every component and wire comprising a bridge circuit has capacity to ground. These capacities are unavoidable, but nevertheless they represent parasitic and undesirable effects. However, these effects are made negligible by the inclusion in the circuit of a so-called Wagner ground. This ground is composed of two resistances 100, 102 connected across leads 77a and 77b near the volt meter 78, and grounded at 104. These resistances are made equal to each other and are of low impedance as compared to the impedance of the various arms of the bridge circuits. Because all bridge circuits are balanced to a 1:1 condition, this single Wagner ground is also adjusted to a 1:1 relationship and is thus able to serve all bridge circuits.

This Wagner ground eliminates undesirable effects due to grounding in the following manner: With a given pick-up unit at rest and its bridge circuit balanced, the potential of the mid-point of the potentiometer 88 is the same as the potential of the lead-in 72, because each of these two points is at a potential midway between that of the two wires leading from switch 82. Another point which occupies a similar mid-position and therefore is at the same potential, is the point midway between the Wagner ground arms 100, 102. But, this point is actually grounded and hence the two other mid-points which are at this same potential are also at ground potential, although they are not actually grounded. Since these two balance points of the bridge are each at ground potential, it follows that capacity to ground from either of these points will produce no parasitic currents since no voltage is acting. This is very important from the standpoint of eliminating difficulty due to the capacity which exists within the pick-up connection cable between the ground shield and lead 72. Capacity to ground from other points of the bridge circuit can, in general, be visualized as acting in parallel with one or the other of the Wagner ground arms 100, 102. Since all stray ground capacities are actually of small magnitude, it follows that their impedances are very high and therefore have negligible effect on the total impedance when considered as operating in parallel with a low impedance circuit member such as 100, 102.

How various pick-up units can be combined by the switching arrangements shown, for the purpose of analyzing various vibrations, is now described. As previously stated, it is possible to accomplish vector addition, vector subtraction, and to establish phase relationship of the mechanical accelerations to which two or more of the pick-up units are responding. Vector addition of the accelerations to which the two pick-ups corresponding to the bridge circuits in Fig. 8 are responding, can be made by closing switches 80 and 80a and also closing switches 82 and 82a, both switches being closed in the same direction. Switches 84 and 84a would each be connected to leads 85b for the horizontal channel, or, if desired, to leads 85a for the vertical channel; that is, to either transformer 86b or 86a. The effect of this switching combination is to form what amounts to a single bridge circuit out of the two individual circuits. Each arm or member of the resultant bridge is formed by the parallel combination of the corresponding members of the two individual bridges. Thus, resistor 96a is directly in parallel with 96 while the ratio arms are also in parallel directly. The combination of elements 94, 95 and 98 is in parallel with the combination of elements 94a, 95a and 98a.

The mathematical equations which describe the output of this combination in terms of the accelerations imposed on the two pick-up units shown are complicated, but the net result briefly means that the electrical output of the combination bridge circuit is equivalent to that which would be obtained from a single pick-up unit and bridge circuit if the single unit were subjected to one-half of the vector sum of the accelerations being imposed on the two pick-up units of the combination.

The vector form of the accelerations which is mentioned above must be understood as referring to accelerations which are associated with periodic motions and which are therefore themselves periodic. Such a quantity is similar to an alternating current or voltage, and may, in a similar manner, be represented by a vector which possesses an effective value such as a magnitude, and which also acts with a certain time or phase displacement when referred to a time reference standard. Therefore, in speaking of the vector sum of two such accelerations, it is clear that the direction part of each vector is actually a time phase, and does not refer to the physical direction or orientation in space along which the accelerations are acting. It is recognized that instantaneous values of accelerations acting with a given orientation in space are vectors, but the vector combination accomplished by the instant invention is concerned with time phase, and not with space orientation. This does not mean that the space orientation is indefinite or indeterminate as far as the apparatus of this invention is concerned. There is no ambiguity, because the basic mechanical system of the pick-up units is selective in its response, and only those accelerations which are directed along the axis of the pick-up are effective in producing any electrical response in the equipment. In view of the above. it is clear that a vector combination accomplished by this apparatus is significant only when the accelerations combined are both periodic and both of the same frequency, because it is only when the frequencies coincide that there is any meaning attached to the conception of a time phase displacement existing between two vectors representing periodic accelerations.

With this understanding of the terms used, the possibility for use of vector combinations by the apparatus will be discussed. Referring to the previous description of the switching combination required in order to obtain the vector addition, it will be noted that the essential conditions for vector additions are:

(a) Both switches 80 closed;
(b) Both switches 82 closed in the same direction;
(c) Both switches 84 and 84a closed to make connection to the same high frequency amplifier of either the horizontal or vertical channel.

It is to be noted that the output of this combination is one-half of the vector sum directly. Furthermore, the method is general, and, if desired, the vector sum of accelerations applied to all the pick-ups could be obtained. When such is desired, all the switches are closed as set forth above. The output of this combination will be the vector sum of the several accelerations to which the individual pick-up units are responding, divided by the number of pick-up units entering into the combination. The fact that the sum is always divided by the number of pick-ups is an inherent characteristic of this method of switching, and means that basically the action is that of averaging. Thus, if the accelerations entering into a given result are all in phase, the vector sum becomes a simple arithmetic sum, and the act of dividing between the number of units in use means that the result is the average of the individual accelerations.

Vector subtraction is, of course, only a special case of vector addition. Subtraction implies that the sense of the vector is reversed, for example, its phase is shifted by 180°. This is readily accomplished by use of the switches 82 and 82a, which reverse the phase of the input or carrier frequency voltage to the bridge circuit. Phase reversal of the input voltage results in a reversal or a 180° phase shift of the bridge output voltage. The switching arrangement for subtraction of the pick-up unit connected through switch 80a, and the pick-up unit connected by switch 80, is as follows:

(a) Switches 80 and 80a closed;
(b) Switch 82 closed in one direction, and switch 82a closed in an opposite direction;
(c) Switches 84 and 84a closed in the same direction.

The resulting output of this combination will be one-half the vector difference; that is, one-half the vector sum of one pick-up response added to the response of the second pick-up taken after a phase shift of 180°. Actually, the resulting output would be essentially the same if under (b) above, the positions of both switches 82 and 82a were reversed. The essential point is that the switches 82 and 82a are all closed in the same direction for addition, while they are closed in opposite directions for subtraction. Just as for addition, the output consists of the vector result divided by the total number of pick-up units connected to the particular amplifier channel.

An example of a practical use of the adding and subtracting features of the equipment is given in separating the bending and torsion modes of vibration in an airplane wing, or tail surface. Two pick-up units are attached to the structure of the wing, both at the same distance out from the center line of the airplane. One unit is located forward of the neutral axis, and the other aft of this axis. The neutral axis is by definition the axis about which torsion takes place, hence the axis itself offers no deflection due to torsion. That is, the motion at this point in the wing cross-section would therefore consist solely of pure bending motion. Both pick-up units are similarly oriented with their sensitive axes directed to respond to motion due to wing bending. With the two pick-up circuits connected to the vertical channel and combined for subtraction, the resulting trace on the oscilloscope screen is used to find the vibration frequency, and the height of the trace on the screen interpreted in terms of the calibration of the apparatus indicates one-half of the acceleration due to torsion.

The accelerations due to bending would be the same at each pick-up unit and the subtraction arrangement therefore cancels these accelerations. When using the accelerometer characteristic of the pick-up, the actual difference in pick-up motions for the two units is given by the accelerations as found from the oscilloscope divided by one-half the square of the frequency; this one-half factor being introduced to cancel the one-half arising from the subtraction characteristics of the equipment. This quotient, giving the difference in the linear motion in the two pick-up units due to torsion, is further divided between linear distance by which the pick-ups are separated in their attachment to the wing structure, and the resulting quotient gives the angle of wing torsion in radians.

The determination of the pure bending motion can also be ascertained if the position of the neutral axis is known, so that the pick-up units can be located at equal distances from it; one being forward of the axis and the other being aft. If this condition is met, then the pick-up circuits are connected for addition, with the result being the average of the two accelerations, which represents that of the mid-point of the line connecting the two pick-ups, that is, the acceleration occurring at the neutral axis. This point by definition does not partake of any torsional motion, and hence the resulting trace on the oscilloscope is the result of accelerations due to pure bending. Determination of the frequency and reference to the equipment calibration therefore, permit determination of any valuation of the wing motion occurring at the span location of the pick-up, that is, at its distance from the center line of the airplane.

In the entire foregoing discussion of vector addition and subtraction combinations for two or more pick-up units, equal sensitivity has been applied for all the units and bridge circuits entering into the combination. This condition is most important, in fact, it is absolutely essential to the successful use of the vector combination feature. All bridge circuits and pick-up units are made as nearly identical as possible. In this connection the adjustable pole pieces of the pick-up units are very important. However, in spite of careful construction, some difference may be found in the response of two bridge circuits even when their pick-up units are subjected to the same acceleration. This condition is compensated, however, by proper adjustment of the resistors 98 and 98a, Fig. 8, which are included in each bridge circuit. These resistors in combination with the unadjustable resistors 96 and 96a form a potentiometer by which the output of each bridge may be adjusted without alteration in the phase of the output voltage. Thus the overall sensitivity of each pick-up unit and bridge circuit may be adjusted so that all sensitivities are matched.

In addition to the use of the equipment for vector addition and subtraction, it is also used to determine the phase relationship between two periodic vibrations having the same frequency. Thus if two pick-up units are attached to different portions of a structure which is vibrating at a given frequency, the following operation of the switches would be used to obtain an indication of the phase relationship:

(a) Switches 80 and 80a closed;
(b) Switches 82 and 82a closed in the same direction;
(c) Switch 84 closed to make contact with the vertical channel, and switch 84a closed to make contact with the horizontal channel.

The spot on the oscilloscope screen will trace a pattern in which the vertical components of motion represent acceleration imposed on the first pick-up through switch 84 while the horizontal components of the motion are due to accelerations imposed on the second pick-up through switch 84a. For recurring periodic vibrations, the trace on the screen will be a closed stationary figure. If the vibration is all taking place at a single frequency, the figure on the screen will be some form of an ellipse. For zero and 180 degree phase displacements, the ellipse degenerates into a straight line, which will lie in the first and third quadrants for zero degrees, and in the second and fourth quadrants for 180 degree displacement. For 90 and 270 degree displacements, the ellipse becomes a circle, provided also that the maximum horizontal and vertical amplitudes on the screen are equal. Whether or not this condition is met, the phase relationship may be deduced by a skilled operator from observations on the oscilloscope screen as to the shape, orientation, and magnitude of the ellipse.

In connection with the switch position used to secure phase patterns, it will be noted from (b) above, that the switches 82 and 82a may be closed in either position. It might be thought that by reversing the position of switch 82 without a change of switch 82a, a phase change of 180° would be produced. This is not true. Reversal of switch 82 does not change the phase of the bridge output voltage of the phase pick-up by 180°, but this applies only to the carrier frequency. After passing through demodulation, the carrier is no longer present and consequently its phase has no effect on the voltage applied to the oscilloscope. In the case of addition and subtraction, voltages and current are combined before demodulation and carrier frequency phase relationships are significant, but in the case of phase determination, the two voltages to be compared are combined at the oscilloscope after demodulation, and hence the position of switches 82 and 82a which affect only the phase of the carrier frequency currents and voltages have no bearing on the final result.

A practical example of the use of phase determination exists in the determination of the phase relationship between the bending and torsional modes of vibration in an airplane wing. This phase angle is of importance in flutter vibration testing, and can be conveniently found as follows: Three pick-up units are attached to the wing structure at equal distances from the center line of the airplane, and all three will be oriented to respond to bending motion. The third unit is located as close as possible to the neutral axis of the wing so that its acceleration is in response to bending with negligible effect from torsion. The first two units are separated sufficiently to make their vector subtraction output a good measure of wing torsion. The output voltage from the bridge circuits of the first two units is fed to either the horizontal or the vertical channel, while the output voltage from the third bridge circuit from the third unit representing bending motion is fed into the other channel. A switching combination to secure this result is as follows:

(a) Switches 80, 82a, etc., are closed;
(b) Switch 82 closed in position X; switch 82a in position Y, and the corresponding switch for the third pick-up unit is closed in either the X or Y position;
(c) Switches 84 and 84a connected to the horizontal channel, and the switch for the third pick-up unit connected to the vertical channel.

Interpretation of the resulting figure on the oscilloscope screen will give the required phase relationship existing between the bending and torsional modes of the wing vibrations.

The above illustrates the flexibility of the switching mechanism in providing for the determination of the phase relationship between two coupled modes of vibration. In general, the phase relationship existing between two motions of the same frequency may be determined by the equipment, regardless of whether one pick-up unit or a group of pick-up units are required to detect each motion. The general switching instructions for determination of phase relationship are as follows:

(a) All switches 80, 80a, etc., closed for those pick-ups entering into the measurement;
(b) For all pick-up units whose effect is to be additive, switches 82, 82a, etc., are closed in position X; for all units intended to be subtractive, all switches 82, 82a, etc., are closed in position Y;
(c) For those pick-up units used in detecting one of the motions, switches 84, 84a, etc., are closed to the horizontal channel; while for the remaining pick-up units used in detecting the other motion, switches 84, 84a, etc., are closed to make contact with the vertical channel.

In connection with all the foregoing discussion of phase relationship, it must be recognized that the previous definitions apply, and phase refers entirely to the time relationship and not to the space orientation of the accelerations. The space orientation is completely determined by the selective response of the pick-up units which forces the orientation of the accelerations measured to coincide with the orientation of the pick-up units themselves. Furthermore, the phase relationship indicated by the equipment is always that existing between accelerations. For sinusoidal vibrations, the phase relationships existing between the amplitude, velocity, and accelerations are well known from elementary mechanics. Hence, after the phase relationship between the accelerations associated with two motions are determined by the equipment, all the other phase relationships are readily computed.

The output from the bridge and switching circuits is fed into either the transformer 86a for the vertical channel or the transformer 86b for the horizontal channel, after the circuits have been combined as just previously described. As shown in Fig. 1, the current passes from the bridge circuits and switches to a high frequency amplifier which is more particularly shown in the circuit diagram of Fig. 9, which is described for the vertical high frequency amplifier. From transformer 86a, the current is passed through two stages of resistance coupled amplification comprising the vacuum tubes 100T and 102T which function as the principal source of voltage gain. A transformer coupled push-pull stage, embodying power amplifier vacuum tubes 104T and 106T is used as a source of power adequate to operate an electromagnetic oscillograph. Since this amplifier operates on essentially constant frequency in the audio range, it presents no special problems. Design is such as to secure stable operation with essentially constant amplification over the operating ranges of supply voltages. The output transformer 108 is equipped with two output windings 110 and 112, respectively. The low impedance winding 112 is intended for connection to the electromagnetic oscillograph. The higher impedance winding 110 is connected to the "G" meter circuit more particularly shown in Fig. 11, and to the demodulator more particularly shown in Fig. 10. All power for operation of the vacuum tubes is supplied through a plug 114 connected to a flexible power cable. This is actually a portion of the single cable and plug which connects all vacuum tube units to the power supply unit of Fig. 1, and shown in detail in Fig. 13.

The circuit diagrams for the demodulator, filter, and low frequency amplifier units of the vertical channel are shown in Fig. 10. The input is from the secondary winding 110 of transformer 108 which is the output transformer of the vertical high frequency amplifier of Fig. 9. Connections to the input of the demodulator are made from leads 182 and 184, at 116 and 118, respectively. In addition, switch 120, which is the "G" switch of Fig. 1, is shown. It is used to connect the "G" meter to either the horizontal or vertical channel, and is shown more completely in Fig. 11, which is the "G" meter circuit diagram. It will be noted further that a resistor 122 is connected between the points 116, 118; this resistor being used to stabilize the circuit operation and to form a more constant load on the transformer 108. The object is to avoid changes in the sensitivity of the channel which would otherwise be caused by impedance changes due to switching the "G" meter from one channel to the other.

Vacuum tube 124 is a duplex tube functioning in two separate circuits; that is, the demodulator, and the low frequency amplifier, circuits. The tube is known technically as a "duplex diode, high mu triode, RCA No. 75." Functionally, two separate tubes could just as well be used, but for economy in space and power requirements the single tube is preferable. The two diode elements are connected together to form a half-wave rectifier which, in conjunction with the resistors 128 and 138, and capacitors 130 and 132, comprises the demodulator circuit. Because of the rectifier action, a voltage is developed across resistor 138 which is always of the same polarity, and has a magnitude which varies in response to the magnitude of the carrier frequency voltage supplied by transformer 108. Hence the variation in voltage across resistor 138 represents demodulation of the carrier and; that is, of the mechanical vibration. This voltage is applied to the triode element of tube 124 by means of a conventional grid coupling circuit consisting of capacitor 134 and resistor 136. The filter element is inserted between resistor 136 and the grid of tube 124.

As previously stated, the function of the filter is to focus attention on the frequency range which contains the mechanical vibrations being investigated; other mechanical vibration frequencies being suppressed. The apparatus described is intended for investigation of flutter where the lower frequencies are of importance and high frequencies due to engine vibrations are extraneous. The filter is designed to pass all frequencies from zero up to the cut-off frequency. Above the cut-off frequency attenuation occurs to suppress all higher frequencies.

The filter is of conventional design and comprises a central prototype "T" section combined with "M-derived" terminating "L" sections used at both input and output ends. The "M-derived" "L" sections provide essentially constant input and output impedances for the filter over the operating range of frequencies. The series inductance of each "L" section has been combined with the adjacent inductance of the "T" section so that only four choke coils 140, 142, 144 and 146 are required in each channel. Six capacitors, 148, 150, 152, 154, 156, and 158 are used, three at a time; switches 160, 162 and 164 being provided to obtain the proper selection. With these switches set to capacitors 148, 152 and 156, switch 166 being open, the cut-off frequency is 600 cycles per minute; while with the switches set to the other capacitors; namely, 150, 154 and 158, the cut-off frequency is shifted to 120 cycles per minute. On the other hand, all attenuating action may be eliminated by placing switches 160, 162 and 164 in the open position while switch 166 is closed. Various filter characteristics may be obtained from the different combinations possible with the three switches 160, 162 and 164, but in all cases where filter action is desired, switch 166 will be open.

The output of the filter is applied to the grid of the triode section of tube 124. This section of the tube operates as a resistance-capacity coupled amplifier working into the load resistance 168. The low frequency amplifier gives a voltage gain of approximately 50. Very little power output is required, since the connected load consists only of the oscilloscope which has an input impedance of 500,000 ohms. Connection to the oscilloscope is made through a plug 170 to a flexible oscilloscope cable. This cable is of the type employing a grounded metallic shield and is similar to the pick-up connection cables, except that two instead of three conductors are used. The circuit of the low frequency amplifier is conventional, but the values of resistors 136, 168 and 172, and capacitors 134, 174 and 176 have been specially designed with a view to maintaining the voltage amplification even at very low frequencies, 60 cycles per minute. This unit functions with a diminishing amplification factor even down to 30 cycles or less per minute.

However, in common with all resistance-capacity coupled amplifiers, the gain becomes zero at zero frequency; that is, at zero frequency nothing is passed by the amplifier. This is because of the capacity type of coupling; which for any finite value of the capacitor 134 offers infinite impedance to any zero frequency phenomena. Since the impedance of capacitor 134 varies widely over the frequency to be investigated, 60 to 1200 cycles per minute, that is, 20:1, it follows that for a given amount of amplification, the design, cost, and physical size of this amplifier are not so favorable as that of the high frequency amplifier where the frequency range amounts to less than 1.01:1.00. For this reason, the principal amount of gain is secured in the high frequency amplifier.

The power connections to this unit are made through the power connection plug 114 coming from the "power supply" of Fig. 1.

The circuit diagram for the "G" meter circuit is shown in Fig. 11. The function of this meter is to indicate the average value of the acceleration being imposed on a given pick-up unit. Transformers 108 and 180 represent the output transformer of the vertical and horizontal high frequency amplifiers, respectively. Leads 182 and 184 from secondary winding 110, and leads 183 and 185 from secondary winding 181, are brought to a switch 120 which is a double pole, double throw, center-off position switch, and is the "G" switch of Fig. 1. This switch makes it possible to isolate the meter or to connect it to either of the amplifiers for the horizontal and vertical channels. The meter consists of a sensitive D. C. microammeter 187 which is the "G" meter of Fig. 1. A full wave rectifier unit 186 is used to convert the alternating current to continuous current to operate meter 187. An additional full wave rectifier 188, and a transformer 190 are also used to secure the desired type of meter response. Adjustable resistors 192, 194 and 196 are provided as a means for controlling the characteristics of the meter. All three resistors affect the sensitivity of the meter and, in addition, resistor 192 affects the damping. Since the microammeter is a permanent magnet, moving coil instrument, rotation of its moving system will generate a voltage in its coil and the resultant current flow develops torque that opposes the rotation which is generating the voltage. The amount of this current, and hence the damping torque developed, is controlled by resistor 192 which is called the "damping adjustment." If damping is small, the meter is free to move rapidly and shows the effect of transient disturbances by a "kick." If damping is heavy, the response of the meter becomes sluggish, and even when severe momentary transients are encountered, a stabilized meter reading of the average is obtained. Resistor 192 being set to give the desired value of damping, the overall sensitivity is then adjusted to the desired value by means of resistor 196, termed the "series sensitivity adjustment," and resistor 194, termed the "shunt sensitivity adjustment."

The circuit diagram for the oscillator used to supply the carrier frequency current to the bridge circuits of Figs. 1 and 8, is shown in Fig. 12. Vacuum tube 200 is an oscillator. The primary of the transformer 202 serves as a tuned resonant circuit. Switch 204 is termed the "coarse frequency control." It provides for three separate operating frequencies corresponding to the three values of capacity which it is used to select. No capacitor is connected to point 206 of switch 204; hence when the switch is at this setting, the distributed capacity of the transformer is the only capacity acting, and the oscillating frequency is a maximum. The adjustable resistor 208 is called the "fine frequency control," and it is used as a Vernier adjustment supplementing the selective action of switch 204. It functions by partially short-circuiting one-half of the secondary winding of transformer 202 to vary the effective inductance of the transformer primary. It also varies the voltage of the oscillator, but an independent voltage control is provided by the potentiometer 210 which determines the voltage output of the entire oscillator unit by controlling the bridge voltage applied to the buffer amplifier comprising the tube 212. Potentiometer 210 is called the "output control."

Buffer amplifier 212 is coupled by transformer 214 to the push-pull power output stage which employs two-beam power tubes 216 and 218, and is capable of delivering 32 watts of output power. Negative feed back is used to eliminate harmonic distortion, and thus to maintain the purity of the sine wave generated by the oscillator. Output transformer 220 is connected by a flexible cable (with grounded metallic shield) to leads 77a and 77b of the group of individual bridge circuits shown in Fig. 8. The power output is ample to operate all these individual bridge circuits simultaneously. The arrangements of the coarse and fine voltage controls (note Fig. 8) is such that these low resistance potentiometers constitute the principal load on the oscillator; the load of one, or even all of the individual bridge circuits, being small as compared to that of the potentiometers. This apparent waste of oscillator power is used to secure the following advantages:

(a) Essentially constant load on the oscillator creates stable operation and avoids changes in voltage when switching individual bridge circuits on and off.

(b) Low resistance connected across the inputs of the bridge circuits is important from the standpoint of maintaining constant sensitivity in each circuit; these keeping this sensitivity independent of the other bridge circuits which may be turned on and off by means of their switches 80.

The oscillator unit has therefore been designed to supply ample power so that the whole equipment sensitivity and operation conditions are independent of the number of bridge circuits simultaneously in use.

The oscillator is equipped with a dynamotor 222 which is used to supply the high voltage continuous current required by the four vacuum tubes. A conventional choke 224 and filter capacitors 226 and 228 are used to smooth the commutator ripple voltage.

The equipment is designed primarily for operation from a 12-volt storage battery, through binding posts 230, but for use on larger aircraft with a 24-volt electrical system, direct connection to the power lines may be made by means of 24-volt binding posts 232. When this connection is used, resistors 234 and 236 are in the circuit and limit the current to the same value as would be obtained for normal 12-volt operations. Switches 238 and 240 control the dynamotor and vacuum tube heater circuits, respectively. Pilot lights 242 and 244 give indication as to the operation of these two circuits, while fuses 246 and 248 give protection. An additional fuse 250 protects the high voltage circuits.

Fig. 13 shows the circuit diagram for the power supply unit of Fig. 1. This unit is used to supply the operating voltage and current required by the vacuum tubes used in all amplifier and demodulator units. High voltage for the plate supply of the vacuum tube is obtained from different sources according to the requirements of the various tubes, which may be divided into two classifications:

(a) Those used to secure voltage gain, but not required to supply much output power. Six tubes fall into this classification, three in each channel, that is to say, the first two stages of the high frequency amplifier and the single stage of the low frequency amplifier designated as tubes 100T, 102T and 124 in Figs. 9 and 10 representing the vertical channel.

(b) Those used to deliver an appreciable amount of power. Four vacuum tubes fall into this classification, two in each channel, to wit: the push-pull power output stage, which is the third in the high frequency amplifier, these being tubes 104, 106 in Fig. 9 representing the vertical channel.

Those vacuum tubes listed under (a) above, are supplied from a B-battery of 225 volts because variations in plate supply voltage to any of these tubes would cause serious disturbances, and a battery supply represents the simplest and most stable supply of voltage available. These vacuum tubes deliver little power and accordingly their plate current requirements are low. A very small, light weight battery housed in the power supply case is ample to supply all these tubes for many hours of operation. On the other hand, those vacuum tubes listed under (b) above, are used to deliver power sufficient for the operation of an electromagnetic oscillograph, and consequently they require relatively large amounts of plate current which could not well be supplied from a battery of reasonable size. Also, the push-pull arrangement makes these stages much less sensitive to variations in plate supply voltage. Accordingly, the power output tubes are supplied from two dynamotors, one for each channel. One dynamotor 260 is shown in Fig. 13 which supplies the vertical channel. Commutator ripple voltage is smoothed by the use of a conventional filter which includes a radio frequency choke 262 as well as an audio-frequency choke 264. A master switch 266 controls all power to the units comprising the vertical channel, and a pilot lamp 268 indicates whether or not the channel is in use. Fuses 270, 272, 276 protect the B-battery dynamotor input, and vacuum tube heater circuits, respectively. Fuse 278 protects the high voltage dynamotor circuit. This power supply unit is intended to operate from the same battery that supplies the oscillator unit. Accordingly, it is basically designed for a 12-volt input at binding posts 230, but resistors 280, 282, are provided in the connection from posts 232 to the 24-volt supply in the event that the unit is to be connected to a 24-volt power line of an aircraft. Resistors 280 and 282 are adjusted so that the input current for 24-volt operation is the same as that for 12-volt operation.

Duplicate equipment is furnished for the horizontal channel. The power connection plug 114 is shown having leads connected thereto only for the vertical channel. A single volt meter 284 is used in conjunction with a switch 286 which is common to the horizontal and vertical channels to provide a ready means of checking the performance of the power supply. Switch 286 is divided into two parts, 286a and 286b, both of which are operated from a single knob. The various positions of the switch permit volt meter readings of the battery input voltage, vacuum tube heater voltage, dynamotor input voltage, dynamotor output voltage, and B-battery voltage for each channel.

In the assembling of the apparatus as compactly as possible, the switches, bridge circuits, amplifiers, demodulators, and filters are housed together. The oscilloscope is housed separately, and the oscillator and power supply are housed separately. Each of these three units of equipment is mounted on a special shock-proof base which protects the apparatus from the severe mechanical vibrations which are sometimes present during flight test conditions.

After the equipment is placed in a convenient position in an aircraft, a suitable length of cable is spliced onto the short pick-up connection and carried through the wings or other structure of the aircraft to the apparatus which contains the switches and bridge circuits. At the other end, the cable is fitted to a plug for easy and rapid connection to the equipment.

*Modes of operation*

The equipment described above may be operated to produce several different types of response. The application of carrier frequency current to the bridge circuits of Fig. 8 has been previously described, and the method of balancing the bridges discussed. Completely balanced bridge circuits have been implied. These give no output voltage as long as their pick-up units are not responding to any acceleration. Other modes of operation are as follows:

*Completely balanced bridge operation*

This type of operation may be visualized by reference to Figs. 14a to 14f, inclusive, which illustrate the performance obtained for various degrees of bridge balance. The several curves of these figures all have time as the horizontal coordinate, and for all except the first, voltage is the vertical coordinate. The first curve, Fig. 14a, represents two cycles of a sinusoidal acceleration acting on a pick-up unit. This acceleration causes a corresponding displacement of the inductor of the pick-up with the result that the bridge circuit becomes periodically unbalanced and carrier frequency voltage appears as the output. This voltage is represented by the closely spaced waves shown in Fig. 14b. The horizontal separation is constant because of the constant frequency of the carrier and the amplitudes correspond to the degree of bridge unbalance. Smooth curves have been drawn through the positive and negative maxima to show the envelope, but these are purely fictitious and do not represent any voltage actually occurring in the bridge or "high frequency amplifier" circuits. It is clear that the accuracy with which the envelope can be deduced from the successive positive and negative maxima of carrier frequency depends on the number of cycles of carrier frequency per cycle of mechanical vibration, i. e., upon the ratio $$\frac{F_c}{F_m} = \frac{Carrier\ frequency}{Mechanical\ frequency}$$

The higher this ratio, the sharper will be the definition. The apparatus is specifically intended to operate up to a mechanical vibration frequency of 1200 cycles per minute or 20 cycles per second, while the carrier frequency used is 6000 cycles per second. Hence the minimum value of their ratio is 300. The equipment may be used on mechanical frequencies up to 9000 cycles per minute or 150 per second. This leads to a minimum ratio of 40 which still gives much better definition than that illustrated graphically in Figs. 14a to 14f. Definition will probably be satisfactory as long as the ratio exceeds a value of 10. For still higher mechanical frequencies, (as detected by a pick-up designed for them), the carrier frequency can be raised by readjusting the "oscillator." The actual oscillator used with the apparatus is suitable for use in the region 1000 to 18,000 cycles per second. If desired, this range could be greatly extended both above and below the present limits.

Referring again to Fig. 14b, it will be noted that the group of carrier frequency waves corresponding to the negative half cycles of acceleration (Fig. 14a) are practically identical with the carrier frequency wave groups due to positive half cycles of acceleration. That is, the envelope of Fig. 14b is periodic with twice the frequency of the imposed mechanical vibration. Also the envelope consists of two sine waves superimposed on each other in such a way that each is the mirrored reflection of the other. The net result is a considerable modification from the appearance of the acceleration wave of Fig. 14a. Fig. 14b represents the trace that would be secured on a film using an electromagnetic oscillograph. Actually the high frequency of the carrier would probably crowd the individual traces so that all space within the envelope would appear to be solid black. However, this figure could be interpreted in a very satisfactory manner. The "G-meter," Fig. 11, would also function satisfactorily on this wave. In fact, the transformer 190 and one of the rectifiers could be eliminated since an A. C. microammeter will function as a "G-meter" for the type of operation represented by Fig. 14b, where the average value of rectified voltage is proportional to the acceleration, being zero for zero acceleration. The disadvantage associated with the completely balanced system arises in connection with the use of the "demodulator," "filter," and "oscilloscope." The voltage output of the "demodulator" is represented by Fig. 14c. If no filtering action is used, this is also the form of the trace which appears on the cathode ray screen. The double frequency and inversion of negative half cycles make the determination of phase relationship virtually imposible. Also this wave does not represent to the eye the form of the imposed acceleration. Harmonics, transients, etc., would complicate a trace of the type of curve in Fig. 14c very badly. Filtering action would not only remove higher frequency phenomena, but would also alter the form of the low frequency phenomena being investigated, because Fig. 14c, although derived from a simple sine wave, now consists of a Fourrier series of sine waves comprising many higher harmonics. In view of these facts, a trace of the type Fig. 14c would not be satisfactory on the cathode ray screen, and if completely balanced bridge circuits are to be used, "demodulators" and "filters" are dispensed with; the output of the "high frequency amplifier" is applied directly to the "oscilloscope" so that its screen shows the trace Fig. 14b just as an electromagnetic oscillograph would. Filtering action is not available and phase relationships cannot be determined. A further difficulty with a completely balanced system lies in the fact that balance is complete for only one particular position of the pick-up unit. If the pick-up be tilted out of this orientation, the action of gravity on the inductor is altered so that its "at rest" position is changed and the system becomes unbalanced. Considering changes in attitude of an airplane in flight, landing, etc., it becomes apparent that the completely balanced system is not in general the most desirable, although it does give a means of measuring very low frequency (or even zero frequency, i. e., constant) accelerations.

*Completely unbalanced*

Another method of operation is to work with the bridge circuits considerably unbalanced initially. This system is illustrated by the curve of Fig. 14d. The imposed acceleration is again represented as for Fig. 14a. Before this acceleration begins (i. e., to the left of the starting point of the wave), the pick-up is represented as being at rest and the bridge output voltage is shown with a double amplitude of EF which represents the unbalance. At the conclusion of the two cycles of acceleration, the pick-up returns to an "at rest" condition and the unbalance voltage again amounts to E'F' which equals EF. During positive half cycles of acceleration, the motion of the pick-up inductor is represented as increasing the unbalance, thereby causing greater output voltage from the bridge circuit. Accordingly, for negative half cycles of acceleration, the unbalanced bridge output voltage is decreased, but the displacement of the inductor is never sufficient to balance the bridge and hence the output voltage never becomes zero. The trace appearing on an electromagnetic oscillograph would be as shown, except, of course, that the envelope EE' and FF' being purely fictitious would not appear. This type of modulation is very similar to that employed in radio broadcast transmission. The output of the "demodulator" is represented by the envelope line EE' which is clearly recognizable as a representation of the imposed acceleration of Fig. 14a. Provided that the frequency is within the transmission band of the "filter," the demodulated voltage EE' will pass unaltered to the "oscilloscope" and there produce a visible trace of the same form (EE'). This type of modulation is very satisfactory from the standpoint of producing a trace which represents the acceleration in conventional form so that effects of transients, harmonics, etc., are most readily recognizable. This type also permits use of the "filters" to the best advantage and makes phase determination as simple as possible. The representation on the electromagnetic oscillograph is even better than that obtained from the balanced system. The only disadvantage arises in connection with the "G-meter." A simple A. C. microammeter would be totally unsatisfactory since a reading corresponding to the unbalanced voltage EF would appear even with no imposed acceleration. Further, the increase in unbalanced voltage due to positive half cycles of acceleration is equalled by the decrease due to negative half cycles, so that the average as indicated by an A. C. microammeter would be totally unaffected by the acceleration. Hence not even changes in meter indication could be interpreted as imposed acceleration. This difficulty is overcome in the circuit of Fig. 11 by the use of the two rectifiers and the transformer 190. Carrier frequency current is rectified by 188 and applied as a pulsating continuous current to transformer 190. The pulsations produce a secondary A. C. voltage which is rectified by 186 and causes a deflection of the meter "G." The effect of this arrangement is to saturate the magnetic circuit of 190 by the rectified continuous current and thereby to suppress to a large extent the deflection otherwise produced by the initial or "static" unbalance of the bridge circuit. When the carrier frequency voltage is modulated due to an acceleration, the average value of the rectified current changes and is effective in producing a secondary voltage and a meter deflection. The small meter deflection due to "static" unbalance is compensated by adjustment of the mechanical zero of the meter so that it reads zero for zero acceleration. Sensitivity to small values of acceleration is not great; but as the magnitude of the acceleration increases so that the reduction in rectified current (at the negative half cycles of acceleration) is effective in reducing the magnetic saturation, the sensitivity increases rapidly. The meter may therefore be used as a warning, adjusted to indicate whenever the structure carrying the pick-up is subjected to an average acceleration exceeding a predetermined amount.

*Over modulated operation*

This type of operation is illustrated in Fig. 14f. The acceleration is applied to a pick-up whose bridge circuit has an initial unbalance of JK. The increase in unbalance due to the positive half cycles of acceleration causes an increase in carrier voltage just as for Fig. 14d, but during the negative half cycles, the inductor moves far enough to balance the bridge and then moves on to unbalance it in the opposite direction before beginning its return motion. This condition corresponds to what is called "overmodulation" in the terminology of radio. Twice for each cycle the voltage becomes zero corresponding to the two instantaneous bridge balances, and twice for each cycle the voltage starts at zero, increases to a maximum, and then decreases to zero. This is similar to the balanced bridge modulation of Fig. 14b, but here one set of maxima are greater than the other, due to the initial bridge unbalance. The demodulated voltage is shown at Fig. 14e and in common with Fig. 14c this voltage is non-sinusoidal, making the use of filters, determination of phase relationship and viewing in the oscilloscope generally unsatisfactory. However, if the magnitude of the imposed acceleration had been smaller, so that the pick-up inductor would never move far enough to balance the bridge, then the appearance of Fig. 14f would have been similar to that of Fig. 14d except on a smaller scale as indicating the reduced amount of acceleration. Thus, operation as a completely unbalanced bridge, or operation as an over-modulated circuit is determined entirely by the magnitude of the imposed acceleration as compared to the initial unbalance. In speaking of Fig. 14d as being representative of completely unbalanced operation, it was simply assumed that the unbalance EF is so great that no acceleration to be imposed on the pick-up will be of a magnitude sufficient to cause over-modulation. The system represented by Fig. 14f may actually have some advantage over Fig. 14d if the initial unbalance of the system is adjusted so that over-modulation occurs only when the imposed acceleration is so great as to be dangerous to the structure. The "G-meter" can be adjusted to increase its deflection sharply in response to over-modulation and this serves as an immediate warning to those conducting the test. Once the system has been properly adjusted, the warning is obtained without reference to gain control setting, calibration charts, etc., that are necessary before oscilloscope observations can be interpreted to obtain the warning. The "G-meter" is more sensitive to increasing values of acceleration after over-modulation occurs than before; because before over-modulation, the average value of rectified current is independent of the acceleration; while after, the average rectified current increases with increase of acceleration. Before over-modulation, i. e., while the accelerations acting on the structure carrying the pick-up are limited to safe values, the system behaves similarly to Fig. 14d and allows maximum effectiveness of "demodulator," "filter," and "oscilloscope." Also due to the smaller amount of unbalance, sensitivity may actually be improved.

The newly described magnetic pick-up unit can be used with arrangements of measuring equipment other than that specifically described above. For example, bridge circuits might be dispensed with and the carrier frequency circuit connected to only one of the two coils. Voltage would be induced in the other coil by transformer action; the amount of the voltage being influenced by the position of the inductor so that a modulated wave of the type shown in Fig. 14d could be produced without a bridge circuit. If this system were to be used, it would probably be desirable to make some modification of the arrangement of the pick-up coils and/or magnetic circuit so that the motion of the inductor would be more effective in controlling the voltage induced in one coil by current in the other. A coil wound on the moving member itself would be effective; or the substitution of a cylindrical air gap in place of the plane gap used at one of the two "working" air gaps would improve sensitivity. Also the number of coils in the unit need not be limited to two.

The magnetic pick-up in its present form could be used in a continuous current bridge circuit to replace a carbon pile type unit. The current flowing would produce a steady magnetic field and motion of the inductor would modify this field to induce voltages in the coils. If a permanent magnet were substituted for the soft iron inductor, its motion in response to vibration would induce voltages in the coils. The voltage from one or both coils could be fed into an amplifier without the use of a bridge circuit. As another possible modification, the magnet action could be obtained with an electromagnet rather than a permanent magnet. It would be necessary to supply continuous current to a coil which would act as the magnetizing coil. For a system such as this, modifications of the pick-up coils and/or magnetic circuit, as described above for carrier current operation without a bridge circuit, would improve sensitivity.

Any use of the magnetic pick-up with a continuous current system or with a built-in permanent magnet would result in decreased sensitivity at low frequencies. The alternating current (carrier) systems as previously described lead to an output voltage which is proportional to the acceleration to which the pick-up is responding. In the case of a sinusoidal vibration, this means that for a given amplitude of motion, the output voltage is proportional to the square of the frequency. As compared to this, the continuous current or permanent magnet arrangements would yield an output voltage proportional to the cube of the frequency. Thus the loss of sensitivity at low frequency would be even greater. This is the basic reason for the selection of the carrier frequency system for the present equipment.

Having now described a means by which the objects of this invention may be obtained, what we claim as new and desire to secure by Letters Patent is:

We claim:

1. A pick-up device for inductively producing electric currents in response to accelerations of a vibrating body comprising three metallic rings coaxially aligned and including a center ring and two outer rings, two spring discs initially strained in opposite directions and each extending between said center ring and an outer ring, a metallic mass held by and between said discs, said mass being movable with respect to said rings, two coils each of which being mounted in an outer ring, and means for holding said rings, mass, discs, and coils in assembled position.

2. A pick-up device as in claim 1 further including opposed adjustable poles one of which being adjacent each coil.

3. A system for varying electrical currents in accurate response to the accelerations of a vibrating body comprising a bridge circuit including two coils, a mass movable with respect to said coils in response to said accelerations, adjustable pole means for adjusting to equality the inductances of said coils, means for energizing said coils through said bridge circuit, and said bridge circuit including two ratio arms, first means for equalizing the resistance in said arms, second means connected in series with one of said coils for equalizing the resistance of both of said coils, and variable resistance means joining the midpoint of said ratio arms to the midpoint of said coils.

4. A pick-up device as claimed in claim 1 in which said discs are initially strained in opposite directions by interposition of the metallic mass, whereby said discs during the movement of said mass attain their flat position at different times.

5. A vibration measuring apparatus comprising a plurality of pick-up units, each of which produces impulses in response to vibrations; a bridge circuit for each pick-up unit and connected thereto for electrically measuring such impulses; an alternating current exciting force common to all of the bridge circuits; means for individually paralleling the outputs of the bridge circuits of the pick-up units and including means for selectively combining impulses derived from certain of the pick-up units; and means responsive to combined impulses from the pick-up units.

6. In combination with the apparatus of claim 5, phase-altering means at the points of excitation of the bridge circuit of each pick-up unit.

7. A vibration measuring apparatus comprising a plurality of pick-up units, each of which produces impulses in response to vibrations; a bridge circuit for each pick-up unit and connected thereto for electrically measuring such impulses; means to supply alternating current to said bridge circuits; means for individually paralleling the outputs of the bridge circuits of the pick-up units including means for selectively combining impulses derived from certain of the pick-up units; phase-altering means at the points of excitation of the bridge circuit of each pick-up unit; and means responsive to combined impulses from the pick-up units, said responsive means including a plurality of output channels for selectively separating for comparison the impulses from the pick-up units.

8. In an apparatus for determining phase relationship of vibrations occurring at different points of a structure, a plurality of systems for varying electrical currents in accurate response to the accelerations of a vibrating body, each system comprising a bridge circuit including coils in two arms of the circuit, and a mass movable with respect to said coils and arranged to vary the inductive reactance thereof in response to said accelerations; means to supply alternating current to said bridge circuits; measuring means responsive to variations in the inductances of said coils caused by movement of said masses; switch means in said current supply means to vary the phase of current supplied to one of said bridge circuits with respect to another of said bridge circuits; and means for selectively combining impulses derived from the bridge circuits of certain of said systems.

9. In combination with the apparatus of claim 8, a Wagner ground in said current supply means to minimize stray capacity effects when the bridge circuits of said systems are phased and combined.

EDWARD E. MINOR.
STANLEY A. KILPATRICK.